US010416666B2

(12) United States Patent
Rosenberg

(10) Patent No.: US 10,416,666 B2
(45) Date of Patent: Sep. 17, 2019

(54) METHODS AND SYSTEMS FOR COLLABORATIVE CONTROL OF A REMOTE VEHICLE

(71) Applicant: UNANIMOUS A. I., INC., San Francisco, CA (US)

(72) Inventor: Louis B. Rosenberg, San Luis Obispo, CA (US)

(73) Assignee: Unanimous A. I., Inc., San Francisco, CA (US)

( * ) Notice: Subject to any disclaimer, the term of this patent is extended or adjusted under 35 U.S.C. 154(b) by 55 days.

(21) Appl. No.: 15/904,239

(22) Filed: Feb. 23, 2018

(65) Prior Publication Data

US 2018/0181117 A1 Jun. 28, 2018

Related U.S. Application Data

(63) Continuation-in-part of application No. 15/898,468, filed on Feb. 17, 2018, and a continuation-in-part of
(Continued)

(51) Int. Cl.
*G05D 1/00* (2006.01)
*G06F 3/0481* (2013.01)
(Continued)

(52) U.S. Cl.
CPC ......... *G05D 1/0016* (2013.01); *B64C 39/024* (2013.01); *G05D 1/0022* (2013.01);
(Continued)

(58) Field of Classification Search
CPC .. G05D 1/0016; G05D 1/0022; G05D 1/0038; B64C 39/024; G06F 3/04817;
(Continued)

(56) References Cited

U.S. PATENT DOCUMENTS

| 5,808,908 A | 9/1998 | Ghahramani |
| 7,158,112 B2 | 1/2007 | Rosenberg |

(Continued)

FOREIGN PATENT DOCUMENTS

| CA | 2414397 | 8/2003 |
| JP | 5293249 | 9/2013 |

(Continued)

OTHER PUBLICATIONS

"Dialogr—A simple tool for collective thinking"; Mar. 25, 2015; http://www.dialogr.com./; 1 page.
(Continued)

*Primary Examiner* — Tadesse Hailu
(74) *Attorney, Agent, or Firm* — Fitch, Even, Tabin & Flannery LLP

(57) ABSTRACT

Systems and methods are for enabling a group of individuals, each using an individual computing device, to collaboratively control a vehicle in real-time as a unified intelligence. The collaboration system comprises a plurality of computing devices, each of the devices being used by an individual user, each of the computing devices enabling its user to contribute to the emerging real-time group-wise intent. A collaboration server is disclosed that moderates the closed-loop system, enabling convergence upon a unified group intent. Control commands are repeatedly sent to the vehicle based on the determined group intent.

20 Claims, 11 Drawing Sheets

Related U.S. Application Data application No. PCT/US2017/062095, filed on Nov. 16, 2017, and a continuation-in-part of application No. 15/815,579, filed on Nov. 16, 2017, and a continuation-in-part of application No. 15/640,145, filed on Jun. 30, 2017, and a continuation-in-part of application No. PCT/US2017/040480, filed on Jun. 30, 2017, and a continuation-in-part of application No. 15/241,340, filed on Aug. 19, 2016, now Pat. No. 10,222,961, and a continuation-in-part of application No. 15/199,990, filed on Jul. 1, 2016, and a continuation-in-part of application No. PCT/US2016/040600, filed on Jul. 1, 2016, and a continuation-in-part of application No. 15/086,034, filed on Mar. 30, 2016, now Pat. No. 10,310,802, and a continuation-in-part of application No. 15/052,876, filed on Feb. 25, 2016, now Pat. No. 10,110,664, and a continuation-in-part of application No. 15/047,522, filed on Feb. 18, 2016, now Pat. No. 10,133,460, and a continuation-in-part of application No. 15/017,424, filed on Feb. 5, 2016, and a continuation-in-part of application No. 14/925,837, filed on Oct. 28, 2015, and a continuation-in-part of application No. 14/920,819, filed on Oct. 22, 2015, now Pat. No. 10,277,645, and a continuation-in-part of application No. PCT/US2015/056394, filed on Oct. 20, 2015, and a continuation-in-part of application No. 14/859,035, filed on Sep. 18, 2015, now Pat. No. 10,122,775, and a continuation-in-part of application No. PCT/US2015/035694, filed on Jun. 12, 2015, and a continuation-in-part of application No. 14/738,768, filed on Jun. 12, 2015, now Pat. No. 9,940,006, and a continuation-in-part of application No. 14/708,038, filed on May 8, 2015, and a continuation-in-part of application No. 14/668,970, filed on Mar. 25, 2015, now Pat. No. 9,959,028, and a continuation-in-part of application No. PCT/US2015/022594, filed on Mar. 25, 2015.

(60) Provisional application No. 62/473,442, filed on Mar. 19, 2017, provisional application No. 62/473,429, filed on Mar. 19, 2017, provisional application No. 62/463,657, filed on Feb. 26, 2017, provisional application No. 62/460,861, filed on Feb. 19, 2017, provisional application No. 62/423,402, filed on Nov. 17, 2016, provisional application No. 62/358,026, filed on Jul. 3, 2016, provisional application No. 62/207,234, filed on Aug. 19, 2015, provisional application No. 62/187,470, filed on Jul. 1, 2015, provisional application No. 62/140,032, filed on Mar. 30, 2015, provisional application No. 62/120,618, filed on Feb. 25, 2015, provisional application No. 62/117,808, filed on Feb. 18, 2015, provisional application No. 62/113,393, filed on Feb. 7, 2015, provisional application No. 62/069,360, filed on Oct. 28, 2014, provisional application No. 62/067,505, filed on Oct. 23, 2014, provisional application No. 62/066,718, filed on Oct. 21, 2014, provisional application No. 62/012,403, filed on Jun. 15, 2014, provisional application No. 61/991,505, filed on May 10, 2014, provisional application No. 61/970,885, filed on Mar. 26, 2014.

(51) Int. Cl.
*H04L 29/06* (2006.01)
*B64C 39/02* (2006.01)
*G06F 3/0484* (2013.01)
*G06Q 10/00* (2012.01)

(52) U.S. Cl.
CPC ........ *G05D 1/0038* (2013.01); *G06F 3/04817* (2013.01); *G06F 3/04847* (2013.01); *H04L 65/403* (2013.01); *H04L 65/4076* (2013.01); *G06Q 10/00* (2013.01)

(58) Field of Classification Search
CPC . G06F 3/04847; G06Q 10/00; H04L 65/4076; H04L 65/403
See application file for complete search history.

(56) References Cited

U.S. PATENT DOCUMENTS

| | | |
|---|---|---|
| 7,489,979 B2 | 2/2009 | Rosenberg |
| 7,542,816 B2 | 6/2009 | Rosenberg |
| 7,562,117 B2 | 7/2009 | Rosenberg |
| 7,603,414 B2 | 10/2009 | Rosenberg |
| 7,917,148 B2 | 3/2011 | Rosenberg |
| 7,937,285 B2 | 5/2011 | Goldberg |
| 8,176,101 B2 | 5/2012 | Rosenberg |
| 8,589,488 B2 | 11/2013 | Huston |
| 8,745,104 B1 | 6/2014 | Rosenberg |
| 8,762,435 B1 | 6/2014 | Rosenberg |
| 2002/0171690 A1 | 11/2002 | Fox |
| 2003/0065604 A1 | 4/2003 | Gatto |
| 2003/0079218 A1 | 4/2003 | Goldberg |
| 2004/0210550 A1 | 10/2004 | Williams |
| 2005/0168489 A1 | 8/2005 | Ausbeck |
| 2005/0218601 A1 | 10/2005 | Capellan |
| 2006/0147890 A1 | 7/2006 | Bradford |
| 2006/0200401 A1 | 9/2006 | Lisani |
| 2006/0250357 A1 | 11/2006 | Safai |
| 2007/0097150 A1 | 5/2007 | Ivashin |
| 2007/0099162 A1 | 5/2007 | Sekhar |
| 2007/0124503 A1 | 5/2007 | Ramos |
| 2007/0211050 A1 | 9/2007 | Ohta |
| 2007/0220100 A1 | 9/2007 | Rosenberg |
| 2008/0103877 A1 | 5/2008 | Gerken |
| 2009/0037355 A1 | 2/2009 | Brave |
| 2009/0063379 A1 | 3/2009 | Kelly |
| 2009/0063463 A1 | 3/2009 | Turner |
| 2009/0063991 A1 | 3/2009 | Baron |
| 2009/0287685 A1 | 11/2009 | Charnock |
| 2009/0325533 A1 | 12/2009 | Lele |
| 2010/0169144 A1 | 7/2010 | Estill |
| 2010/0174579 A1 | 7/2010 | Hughes |
| 2010/0299616 A1 | 11/2010 | Chen |
| 2011/0087687 A1 | 4/2011 | Immaneni |
| 2011/0119048 A1 | 5/2011 | Shaw |
| 2011/0141027 A1 | 6/2011 | Ghassabian |
| 2012/0011006 A1 | 1/2012 | Schultz |
| 2012/0013489 A1 | 1/2012 | Earl |
| 2012/0079396 A1 | 3/2012 | Neer |
| 2012/0109883 A1 | 5/2012 | Iordanov |
| 2012/0191774 A1 | 7/2012 | Bhaskaran |
| 2012/0290950 A1 | 11/2012 | Rapaport |
| 2013/0041720 A1 | 2/2013 | Spires |
| 2013/0171594 A1 | 7/2013 | Gorman |
| 2013/0231595 A1 | 9/2013 | Zoss |
| 2013/0298690 A1 | 11/2013 | Bond |
| 2013/0311904 A1 | 11/2013 | Tien |
| 2013/0339445 A1 | 12/2013 | Perincherry |
| 2014/0047356 A1* | 2/2014 | Ameller-Van-Baumberghen ........ H04L 67/10 715/753 |
| 2014/0108915 A1 | 4/2014 | Lu |
| 2014/0128162 A1 | 5/2014 | Arafat |
| 2014/0129946 A1 | 5/2014 | Harris |
| 2014/0162241 A1 | 6/2014 | Morgia |
| 2014/0249889 A1 | 9/2014 | Park |
| 2014/0258970 A1 | 9/2014 | Brown |
| 2014/0279625 A1 | 9/2014 | Carter |
| 2014/0316616 A1* | 10/2014 | Kugelmass ............ G05D 1/101 701/8 |

(56) References Cited

U.S. PATENT DOCUMENTS

| | | | |
|---|---|---|---|
| 2014/0337097 A1 | 11/2014 | Farlie | |
| 2014/0379439 A1 | 12/2014 | Sekhar | |
| 2015/0154557 A1* | 6/2015 | Skaaksrud | H04W 12/06 |
| | | | 705/337 |
| 2015/0156233 A1 | 6/2015 | Bergo | |
| 2015/0170050 A1 | 6/2015 | Price | |
| 2015/0192437 A1* | 7/2015 | Bouzas | G06F 7/00 |
| | | | 701/2 |
| 2015/0242972 A1* | 8/2015 | Lemmey | G06F 21/62 |
| | | | 705/80 |
| 2015/0302308 A1 | 10/2015 | Bartek | |
| 2015/0331601 A1 | 11/2015 | Rosenberg | |

FOREIGN PATENT DOCUMENTS

| | | |
|---|---|---|
| KR | 101273535 | 6/2013 |
| WO | 2014023432 | 1/2014 |
| WO | 2014190351 | 11/2014 |

OTHER PUBLICATIONS

Beni; "From Swarm Intelligence to Swarm Robotics"; Swarm Robotics WS 2004, LNCS 3342; pp. 1-9; 2005.
Cuthbertson; "Artificial Intelligence Turns $20 into $11,000 in Kentucky Derby Bet"; Newsweek Tech & Science; http://www.newsweek.com/artificial-intelligence-turns-20-11000-kentucky-derby-bet-457783; May 10, 2016; 9 pages.
Cuthbertson; "Oscar Predictions: AI Calculates Leonardo DiCaprio Will Finally Get His Oscar"; Newsweek Tech & Science; http://www.newsweek.com/oscar-predictions-artificial-intelligence-predicts-leo-will-finally-get-his-430712; Feb. 26, 2016; 3 pages.
Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.
Deck et al; "Prediction Markets in the Laboratory"; University of Arkansas and Chapman University; J. Econ. Surv., 2013; 33 pages.
Deneubourg et al; "Collective Patterns and Decision-Making"; Ethology Ecology & Evolution; Mar. 22, 1989; pp. 295-311.
Ding et al; "Time Weight Collaborative Filtering"; CIKM'05, Oct. 31-Nov. 5, 2005; Bremen, Germany; pp. 485-492.
EP; Extended European Search Report for EP Application No. 15767909.3 mailed from the European Patent Office dated Sep. 4, 2017.
EP; Extended European Search Report for EP Application No. 15808982.1 mailed from the European Patent Office dated Nov. 28, 2017.
Gauchou et al; "Expression of Nonconscious Knowledge via Ideomotor Actions"; Consciousness and Cognition; Jul. 28, 2011; 9 pages.
Green; "Testing and Quantifying Collective Intelligence"; Collective Intelligence 2015; May 31, 2015; 4 pages.
Hanson et al; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion of the International Searching Authority for PCT/US2015/022594 dated Jun. 29, 2015.
Malone et al; "Harnessing Crowds: Mapping the Genome of Collective Intelligence"; MIT Center for Collective Intelligence; Feb. 2009; 20 pages.
Meyer; "Meet Loomio, The Small-Scale Decision-Making Platform With the Biggest Ambitions"; Mar. 13, 2014; https://gigaom.com/2014/03/13/meet-loomio-the-small-scale-decision-making-platform-wi . . . ; downloaded Mar. 25, 2015; 11 pages.
PCT; International Search Report and Written Opinion of the International Searching Authority for PCT/US2015/035694 dated Aug. 28, 2015.
PCT; International Search Report and Written Opinion of the International Searching Authority for PCT/US2015/56394 dated Feb. 4, 2016.
PCT; International Search Report and Written Opinion of the International Searching Authority for PCT/US2016/040600 dated Nov. 29, 2016.
PCT; International Search Report and Written Opinion of the International Searching Authority for PCT/US2017/040480 dated Oct. 23, 2017.
Rand et al; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.
Rosenberg et al; "Amplifying Prediction Accuracy Using Swarm A. I."; Intelligent Systems Conference 2017; Sep. 7, 2017; 5 pages.
Rosenberg et al; "Crowds vs. Swarms, A Comparison of Intelligence"; IEEE; Oct. 21, 2016; 4 pages.
Rosenberg; "Artificial Swarm Intelligence vs. Human Experts"; Neural Networks (IJCNN); 2016 International Joint Conference on IEEE; Jul. 24, 2016; 5 pages.
Rosenberg; "Artificial Swarm Intelligence, a human-in-the-loop approach to A. I."; Association for the Advancement of Artificial Intelligence; Feb. 12, 2016; 2 pages.
Rosenberg; "Human Swarming and the Future of Collective Intelligence"; Singularity WebLog; https://www.singularityweblog.com/human-swarming-and-the-future-of-collective-intelligence/; Jul. 19, 2015; 7 pages.
Rosenberg; "Human Swarming, a real-time method for Parallel Distributed Intelligence"; Proceedings of IEEE, 2015 Swarm/Human Blended Intelligence; Sep. 28, 2015; 7 pages.
Rosenberg; "Human Swarms Amplify Accuracy in Honesty Detection"; Collective Intelligence 2017; Jun. 15, 2017; 5 pages.
Rosenberg; "Human Swarms, A Real-Time Method for Collective Intelligence"; Proceedings of the European Conference on Artificial Life 2015; Jul. 20, 2015; pp. 658-659.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; "Monkey Room"; Outland Pictures; Amazon; Mar. 30, 2014; 110 pages.
Rosenberg; "New Hope for Humans in an A. I. World"; TEDxKC—You Tube; Sep. 7, 2017; http://www.youtube.com/watch?v=EuRyZT_Uas.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.
Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
Rosenberg; U.S. Appl. No. 15/199,990, filed Jul. 1, 2016.
Rosenberg; U.S. Appl. No. 15/241,340, filed Aug. 19, 2016.
Rosenberg; U.S. Appl. No. 15/640,145, filed Jun. 30, 2017.
Rosenberg; U.S. Appl. No. 15/898,468, filed Feb. 17, 2018.
Salminen; "Collective Intelligence In Humans: A Literature Review"; Lappeenranta University of Technology, Lahti School of Innovation; 1Proceedings; 2012; 8 pages.
Souppouris; "Playing 'Pokemon' with 78,000 People is Frustratingly Fun"; The Verge; Feb. 17, 2014; http://www.theverge.com/

(56) References Cited

OTHER PUBLICATIONS

2014/2/17/5418690/play-this-twitch-plays-pokemon-crowdsource . . . ; downloaded Mar. 25, 2015; 3 pages.

Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.

Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.

Unanimous A. I.; "What is Swarm Intelligence"; 2015; http://unu.ai/swarm-intelligence/; downloaded Oct. 6, 2016; 3 pages.

USPTO; Non-Final Office Action for U.S. Appl. No. 14/738,768 dated Sep. 8, 2017.

USPTO; Non-Final Office Action for U.S. Appl. No. 15/047,522 dated Jan. 5, 2018.

USPTO; Non-Final Office Action for U.S. Appl. No. 14/708,038 dated Feb. 15, 2018.

USPTO; Non-Final Office Action for U.S. Appl. No. 14/859,035 dated Feb. 12, 2018.

USPTO; Non-Final Office Action for U.S. Appl. No. 15/052,876 dated Feb. 22, 2018.

USPTO; Non-Final Office Action for U.S. Appl. No. 15/086,034 dated Feb. 2, 2018.

USPTO; Non-Final Office Action for U.S. Appl. No. 16/668,970 dated Aug. 15, 2017.

USPTO; Notice of Allowance for U.S. Appl. No. 14/738,768 dated Feb. 2, 2018.

USPTO; Notice of Allowance for U.S. Appl. No. 14/668,970 dated Feb. 8, 2018.

Wikipedia; "Swarm (simulation)"; Jul. 22, 2016; http://en.wikipedia.org/wiki/Swarm_(simulation); downloaded Oct. 6, 2016; 2 pages.

Wikipedia; "Swarm intelligence"; Aug. 31, 2016; http://en.wikipedia.org/wiki/Swarm_intelligence; downloaded Oct. 6, 2016; 8 pages.

Yeung et al.; "Metacognition in human decision-making: confidence and error monitoring"; Philosophical Transactions of the Royal Society B; 2012; pp. 1310-1321.

* cited by examiner

METHODS AND SYSTEMS FOR COLLABORATIVE CONTROL OF A REMOTE VEHICLE

This application claims the benefit of U.S. Provisional Application No. 62/463,657 entitled METHODS AND SYSTEMS FOR COLLABORATIVE CONTROL OF A ROBOTIC MOBILE FIRST-PERSON STREAMING CAMERA SOURCE, filed Feb. 26, 2017, which is incorporated in its entirety herein by reference.

This application claims the benefit of U.S. Provisional Application No. 62/473,429 entitled METHODS AND SYSTEMS FOR COLLABORATIVE CONTROL OF A ROBOTIC MOBILE FIRST-PERSON STREAMING CAMERA SOURCE, filed Mar. 19, 2017, which is incorporated in its entirety herein by reference.

This application is a continuation-in-part of U.S. application Ser. No. 14/668,970 entitled METHODS AND SYSTEMS FOR REAL-TIME CLOSED-LOOP COLLABORATIVE INTELLIGENCE, filed Mar. 25, 2015, which in turn claims the benefit of U.S. Provisional Application 61/970,885 entitled METHOD AND SYSTEM FOR ENABLING A GROUPWISE COLLABORATIVE CONSCIOUSNESS, filed Mar. 26, 2014, both of which are incorporated in their entirety herein by reference.

This application is a continuation-in-part of U.S. application Ser. No. 14/708,038 entitled MULTI-GROUP METHODS AND SYSTEM FOR REAL-TIME MULTI-TIER COLLABORATIVE INTELLIGENCE, filed May 8, 2015, which in turn claims the benefit of U.S. Provisional Application 61/991,505 entitled METHODS AND SYSTEM FOR MULTI-TIER COLLABORATIVE INTELLIGENCE, filed May 10, 2014, both of which are incorporated in their entirety herein by reference.

This application is a continuation-in-part of U.S. application Ser. No. 14/738,768 entitled INTUITIVE INTERFACES FOR REAL-TIME COLLABORATIVE INTELLIGENCE, filed Jun. 12, 2015, which in turn claims the benefit of U.S. Provisional Application 62/012,403 entitled INTUITIVE INTERFACE FOR REAL-TIME COLLABORATIVE CONTROL, filed Jun. 15, 2014, both of which are incorporated in their entirety herein by reference.

This application is a continuation-in-part of U.S. application Ser. No. 14/859,035 entitled SYSTEMS AND METHODS FOR ASSESSMENT AND OPTIMIZATION OF REAL-TIME COLLABORATIVE INTELLIGENCE SYSTEMS, filed Sep. 18, 2015 which in turn claims the benefit of U.S. Provisional Application No. 62/066,718 entitled SYSTEM AND METHOD FOR MODERATING AND OPTIMIZING REAL-TIME SWARM INTELLIGENCES, filed Oct. 21, 2014, both of which are incorporated in their entirety herein by reference.

This application is a continuation-in-part of U.S. application Ser. No. 14/920,819 entitled SUGGESTION AND BACKGROUND MODES FOR REAL-TIME COLLABORATIVE INTELLIGENCE SYSTEMS, filed Oct. 22, 2015 which in turn claims the benefit of U.S. Provisional Application No. 62/067,505 entitled SYSTEM AND METHODS FOR MODERATING REAL-TIME COLLABORATIVE DECISIONS OVER A DISTRIBUTED NETWORKS, filed Oct. 23, 2014, both of which are incorporated in their entirety herein by reference.

This application is a continuation-in-part of U.S. application Ser. No. 14/925,837 entitled MULTI-PHASE MULTI-GROUP SELECTION METHODS FOR REAL-TIME COLLABORATIVE INTELLIGENCE SYSTEMS, filed Oct. 28, 2015 which in turn claims the benefit of U.S. Provisional Application No. 62/069,360 entitled SYSTEMS AND METHODS FOR ENABLING AND MODERATING A MASSIVELY-PARALLEL REAL-TIME SYNCHRONOUS COLLABORATIVE SUPER-INTELLIGENCE, filed Oct. 28, 2014, both of which are incorporated in their entirety herein by reference.

This application is a continuation-in-part of U.S. application Ser. No. 15/017,424 entitled ITERATIVE SUGGESTION MODES FOR REAL-TIME COLLABORATIVE INTELLIGENCE SYSTEMS, filed Feb. 5, 2016 which in turn claims the benefit of U.S. Provisional Application No. 62/113,393 entitled SYSTEMS AND METHODS FOR ENABLING SYNCHRONOUS COLLABORATIVE CREATIVITY AND DECISION MAKING, filed Feb. 7, 2015, both of which are incorporated in their entirety herein by reference.

This application is a continuation-in-part of U.S. application Ser. No. 15/047,522 entitled SYSTEMS AND METHODS FOR COLLABORATIVE SYNCHRONOUS IMAGE SELECTION, Feb. 18, 2016 which in turn claims the benefit of U.S. Provisional Application No. 62/117,808 entitled SYSTEM ND METHODS FOR COLLABORATIVE SYNCHRONOUS IMAGE SELECTION, filed Feb. 18, 2015, both of which are incorporated in their entirety herein by reference.

This application is a continuation-in-part of U.S. application Ser. No. 15/052,876 entitled DYNAMIC SYSTEMS FOR OPTIMIZATION OF REAL-TIME COLLABORATIVE INTELLIGENCE, filed Feb. 25, 2016 which in turn claims the benefit of U.S. Provisional Application No. 62/120,618 entitled APPLICATION OF DYNAMIC RESTORING FORCES TO OPTIMIZE GROUP INTELLIGENCE IN REAL-TIME SOCIAL SWARMS, filed Feb. 25, 2015, both of which are incorporated in their entirety herein by reference.

This application is a continuation-in-part of U.S. application Ser. No. 15/086,034 entitled SYSTEM AND METHOD FOR MODERATING REAL-TIME CLOSED-LOOP COLLABORATIVE DECISIONS ON MOBILE DEVICES, filed Mar. 30, 2016 which in turn claims the benefit of U.S. Provisional Application No. 62/140,032 entitled SYSTEM AND METHOD FOR MODERATING A REAL-TIME CLOSED-LOOP COLLABORATIVE APPROVAL FROM A GROUP OF MOBILE USERS filed Mar. 30, 2015, both of which are incorporated in their entirety herein by reference.

This application is a continuation-in-part of U.S. application Ser. No. 15/199,990 entitled METHODS AND SYSTEMS FOR ENABLING A CREDIT ECONOMY IN A REAL-TIME COLLABORATIVE INTELLIGENCE, filed Jul. 1, 2016, which in turn claims the benefit of U.S. Provisional Application No. 62/187,470 entitled METHODS AND SYSTEMS FOR ENABLING A CREDIT ECONOMY IN A REAL-TIME SYNCHRONOUS COLLABORATIVE SYSTEM filed Jul. 1, 2015, both of which are incorporated in their entirety herein by reference.

This application is a continuation-in-part of U.S. application Ser. No. 15/241,340 entitled METHODS FOR ANALYZING DECISIONS MADE BY REAL-TIME INTELLIGENCE SYSTEMS, filed Aug. 19, 2016, which in turn claims the benefit of U.S. Provisional Application No. 62/207,234 entitled METHODS FOR ANALYZING THE DECISIONS MADE BY REAL-TIME COLLECTIVE INTELLIGENCE SYSTEMS filed Aug. 19, 2015, both of which are incorporated in their entirety herein by reference.

This application is a continuation-in-part of U.S. application Ser. No. 15/640,145 entitled METHODS AND SYS- TEMS FOR MODIFYING USER INFLUENCE DURING A COLLABORATIVE SESSION OF REAL-TIME COLLABORATIVE INTELLIGENCE SYSTEM, filed Jun. 30, 2017, which in turn claims the benefit of U.S. Provisional Application No. 62/358,026 entitled METHODS AND SYSTEMS FOR AMPLIFYING THE INTELLIGENCE OF A HUMAN-BASED ARTIFICIAL SWARM INTELLIGENCE filed Jul. 3, 2016, both of which are incorporated in their entirety herein by reference.

This application is a continuation-in-part of U.S. application Ser. No. 15/815,579 entitled SYSTEMS AND METHODS FOR HYBRID SWARM INTELLIGENCE, filed Nov. 16, 2017, which in turn claims the benefit of U.S. Provisional Application No. 62/423,402 entitled SYSTEM AND METHOD FOR HYBRID SWARM INTELLIGENCE filed Nov. 17, 2016, both of which are incorporated in their entirety herein by reference.

This application is a continuation-in-part of U.S. application Ser. No. 15/898,468 entitled ADAPTIVE CONFIDENCE CALIBRATION FOR REAL-TIME SWARM INTELLIGENCE SYSTEMS, filed Feb. 17, 2018, which in turn claims the benefit of U.S. Provisional Application No. 62/460,861 entitled ARTIFICIAL SWARM INTELLIGENCE WITH ADAPTIVE CONFIDENCE CALIBRATION, filed Feb. 19, 2017 and also claims the benefit of U.S. Provisional Application No. 62/473,442 entitled ARTIFICIAL SWARM INTELLIGENCE WITH ADAPTIVE CONFIDENCE CALIBRATION, filed Mar. 19, 2017, all of which are incorporated in their entirety herein by reference.

This application is a continuation-in-part of International Application No. PCT/US15/22594, filed Mar. 25, 2015.

This application is a continuation-in-part of International Application No. PCT/US15/35694, filed Jun. 12, 2015.

This application is a continuation-in-part of international Application No. PCT/US15/56394, filed Oct. 20, 2015.

This application is a continuation-in-part of International Application No. PCT/US16/40600, filed Jul. 1, 2016.

This application is a continuation-in-part of International Application No. PCT/US17/40480, filed Jun. 30, 2017.

This application is a continuation-in-part of International Application No. PCT/US2017/062095, filed Nov. 16, 2017.

BACKGROUND OF THE INVENTION

1. Field of the Invention

The present invention relates generally to systems and methods for enabling a real-time, unified, collective intelligence among networked users, and more specifically, to collaborative control systems and methods for vehicle control.

2. Discussion of the Related Art

Over recent years, live internet streaming services like PERISCOPE®, FACEBOOK® Live, and YOUTUBE® Live, have become extremely popular, enabling individual users to stream real-time video content to large groups of followers. In some instances, this real-time video is "first person" video, captured from the perspective of a (a) a single human user, (b) a remotely controlled unmanned aerial vehicle (e.g. a drone), or could be provided from (c) a robotically controlled (i.e. autonomous) unmanned aerial vehicle or other robotic camera source. Regardless of the camera source, this streaming model for live content is often referred to as a "one to many" architecture because the content originates from a camera source associated with a one user (or one drone) and terminates at a large collection of separate users (i.e. many) who all view the content at substantially the same time. The source content can be streamed to the internet (via a streaming service) from a mobile computing device on the person of the source user or source robot, allowing a large number of followers to experience the live content as real-time voyeurs of the source user, having a vicarious experience of being in the place and time of the source users. This is sometimes referred to as "Telepresence" or "First Person Video" (FPV), especially if the video content captured from the first-person perspective of the source user or robot and then presented as first-person content to the receiving user, for example through video headsets or fixed position immersive video displays. In this way, a large number of receiving users can be given the perspective of being at the location of the source user or source drone, thus having a vicarious experience of that location as the source user or source drone navigates the physical space.

In one example of FPV, a camera source is associated with the source user or source aerial vehicle. The source can be held by a person, but for applications that stream first person video (FPV), the camera source could also be head-worn, for example using a camera-enabled headset. In some embodiments, the camera source could be a stereo camera pair, or 3D camera system, along with stereo microphones. This enables the source user to stream immersive video and audio content that provides highly realistic experiences for receiving users. In some examples, the camera source can be mounted upon a remote-controlled flying drone or a robotic drone, providing the perspective to viewing users of flying along with or driving along with the drone. As commonly known in the art, a remote-controlled drone system can include a drone and a pan-and-tilt camera coupled to the drone. The drone system includes a local controller which is configured to receive commands over wireless communication from a remote device (such as a remote controller) and stream video footage (and optionally audio) to the remote device.

The commands received by the drone are generally high-level instructions about guidance (e.g. drone direction, drone speed, and optionally drone altitude) as well as camera control (e.g. pan, tilt, and zoom), which are interpreted by the drone local controller, which modulates the propeller actuators and camera actuators accordingly. In this way, a human user who is watching the video feed at the remote device (or other device in communication with the remote device), and manipulating a user interface in communication with the remote device, can fly (or drive) the drone remotely. A typical remote controller includes a video display and user interface. In one example, the controller includes a real-time display of streamed video from the drone, as well as joysticks and/or other manually engaged elements for guiding the direction, orientation, altitude, and speed of the drone as well as the pan, tilt, and zoom of the camera.

while it's currently common to share the live video with a large number of online users who can experience the live video from a first-person perspective and thereby have a vicarious experience of being at the camera location, as known in the art the large number of online users are passive viewers. In the case of live video from a drone, the passive views can experience the content from the perspective of the camera on the drone, but the guidance of the drone as generally enabled is for a single user to control. This makes one person the "driver" (or "pilot") and all other users passive viewers who are merely along for the ride. This greatly reduces the potential engagement for the audience, as they lack the ability to guide the drone in real-time.

When viewing real-time first-person video (FPV), the receiving users can view the video on an immersive headset, with optional stereoscopic imagery and surround sound. Such configurations can be highly entertaining because it allows the receiving users to experience what it's like for the source user to navigate the real world from the perspective of the drone. But again, without the ability to influence control the motion of the drone, the user is a passive viewer having an immersive experience rather than an active participant who is contributing to a real-time intelligence that is controlling the drone.

What is needed is a real-time control system that empowers a group of networked users to work together as a closed-loop system to control the motion of the drone, and optionally control the camera's pan and tilt and zoom. This would provide a very unique and powerful experience in which a group of individuals can work together as a unified intelligent system (i.e. an Artificial Swarm Intelligence) to guide a drone around throughout a physical environment, tapping their collective will, wisdom, and intelligence. This would also greatly increase engagement and interactivity of the users. It also enables drones to be controlled with amplified intelligence resulting from the use of human swarms.

To solve these problems, innovative systems and methods are needed to enable groups of users who are simultaneously viewing a real-time video stream from a robotic drone, to work together as a closed-loop system to control the motion of the drone as a unified collective intelligence.

SUMMARY OF THE INVENTION

Several embodiments of the invention advantageously address the needs above as well as other needs by providing a real-time collaborative vehicle control system comprising: a plurality of computing devices each comprising a communications infrastructure coupled to each of a processor, a memory, and a collaborative intent application stored on each memory and configured to run on each processor, and a user interface coupled to a display and configured to receive input from a user; a collaborative server in networked communication with the plurality of computing devices, the collaboration server including a processor and a memory; a vehicle controller configured to receive commands from the collaborative server; and a vehicle operatively controlled by the vehicle controller, wherein the control system is configured to perform the following steps, wherein computing device steps are performed substantially simultaneously on each of the plurality of computing devices: display, on each of the computing devices, vehicle control information, and a collaboratively controlled graphical indication having a coordinate location in relation to the vehicle control information; receive, on each of the computing devices, repeatedly in real-time, user input of a user intent vector through the user interface, the user intent vector having a direction in relation to the user control information and a magnitude, send, repeatedly in real-time, the user intent vector to the collaboration server, responsively determine, repeatedly in real-time by the collaboration server, a group intent vector from the plurality of received user intent vectors, and determine, repeatedly in real-time by the collaboration server, an updated coordinate location based on the group intent vector; determine, repeatedly in real-time by the collaboration server, at least one vehicle command from the group intent vector; send, repeatedly in real-time by the collaboration server, the at least one a vehicle command to the vehicle controller, whereby the vehicle operates in response to the at least one vehicle command; send, repeatedly in real-time by the collaboration server, the updated coordinate location to the plurality of computing devices; and update, repeatedly in real-time by the computing devices, the location of the collaboratively controlled graphical indication using the received updated coordinate location, whereby the coordinate location is updated each time the group intent vector is determined by the collaboration server, whereby a closed-loop system is formed between the collaboration server and each collaborative intent application.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
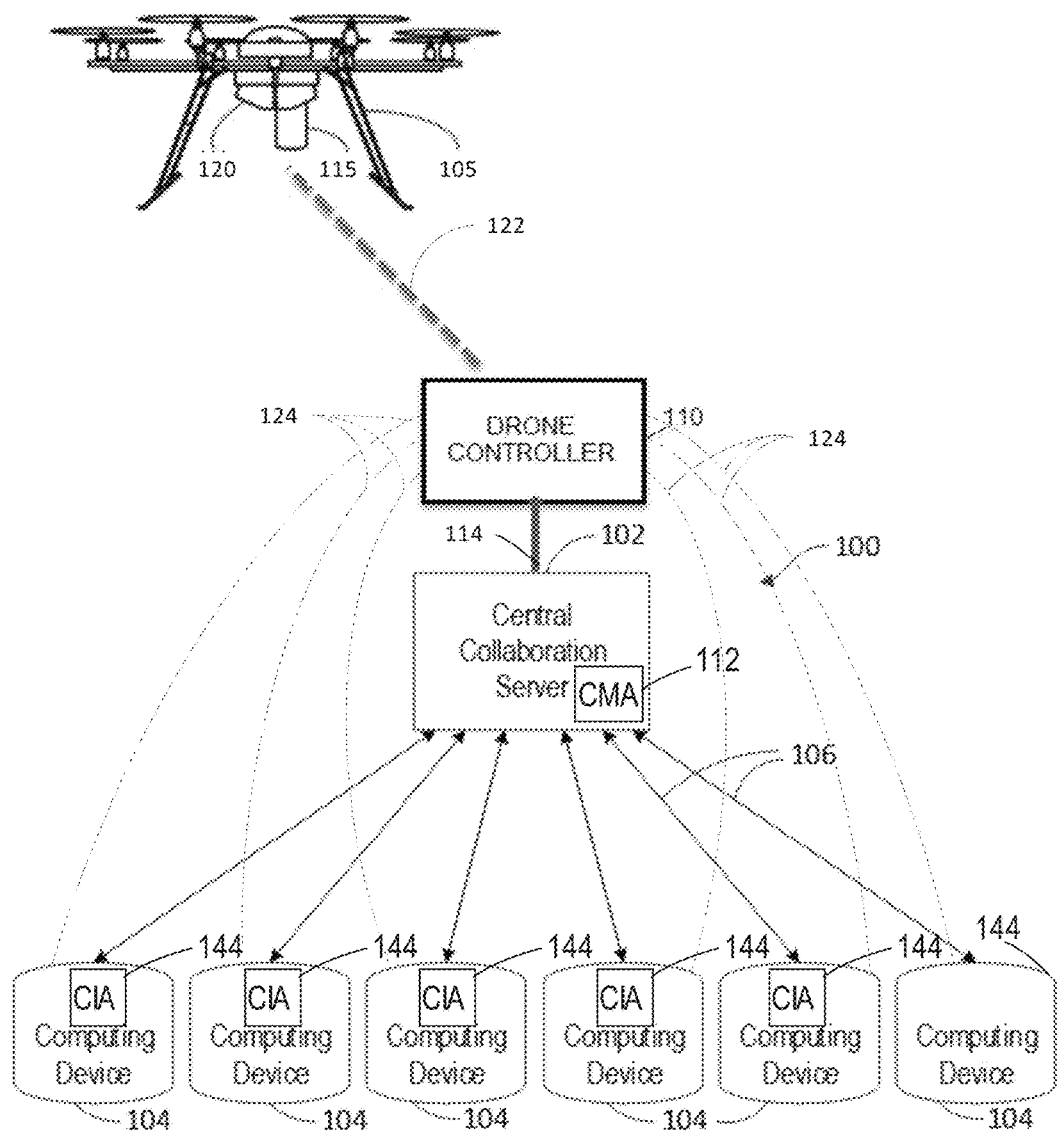
FIG. 1 is a schematic diagram of an exemplary real-time vehicle operation collaboration system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Real-time occurrences as referenced herein are those that are substantially current within the context of human perception and reaction.

As described in related patent applications Ser. Nos. 14/668,970 and 14/708,038, the massive connectivity provided by the Internet is used to create a real-time closed-loop emergent intelligence by collecting real-time input from large numbers of people through a novel user interface and processing the collected input from that large number of users into a singular group intelligence that can control a robotic drone in synchrony, guiding the motion of the robotic drone and optionally controlling the pan or tilt or zoom of a camera on a drone, in real-time. The methods use intervening software and hardware to moderate the process, closing the loop around the disparate input from each of the many individual participants and the singular output of the group.

In one embodiment, each of a plurality of individual users ("participants") engages a user interface on their own portable computing device 104, thereby conveying his or her individual real-time will with respect to the desired motion of a drone in response to viewing the real-time video stream from the drone on a screen of said portable computing device. The video stream is communicated to the portable computing device of each participant over a wireless communication network. A swarm intelligence system combines the real-time input from the plurality of users, closing a feedback loop around the plurality, enabling real-time control of the drone by emergent group intelligence.

Referring first to FIG. 1, a schematic diagram of an exemplary vehicle operation collaboration system 100 is shown. Shown are a Central Collaboration Server (CC) 102, a plurality of computing devices 104, a drone 105, a plurality of exchanges of data 106 with the Central Collaboration Server 102, a drone controller unit 110, a collaboration mediation application (CMA) 112, a server communication link 114, a camera 115, a local controller 120, a drone communication link 122, and a collaborative intent application (CIA) 144.

The server communication link 114 (typically wireless, but in some embodiments may be wired) sends signals between the CCS 102 and the Drone Controller unit 110. The drone controller unit 110 (also referred to as the drone controller) receives commands from the CCS 102, processes those commands, and sends control signals over the wireless drone communication link 122 to the drone 105. The drone 105 includes the local controller 120 that interprets the control signals from the drone controller 110, and controls the actuators on the drone 105 to guide the drone 105 accordingly. In the case of a flying drone 105, the actuators are generally electronic motors controlling propellers. Also on the drone 105 is the camera 115 which may be fixed with respect to the body of the drone 105, or may have actuators that enable pan and tilt motion of the camera 115 with respect to the body of the drone 105. The control signals from the drone controller 110 over the drone communication link 122 represent the desired position and/or motion of the drone 105 and represent the desired position and/or motion of the camera 115 with respect to the drone 105 body. The control signals may also control other camera functions such as the zoom of a camera lens on the camera 115. In this way, commands from the CCS 102 are enabled to control the position, motion, speed, acceleration, altitude, orientation, and/or other dynamic characteristics of the drone 105, as well as control the pan and tilt and zoom of the camera 115 affixed to the drone 105. And in the case of drones 105 that include payloads or end effectors, the CCS 102 can be configured to send commands to the drone controller 110 that indicate how the payload and/or end effectors are to be manipulated by drone actuators.

In addition, the video captured by the camera 115 on the drone 105 is communicated over the plurality of exchanges of data 106 (typically via a wireless network) such that it's streamed to the plurality of portable computing devices 104, in real-time and/or substantially near real-time. The video signal from the camera generally gets processed by drone Local Controller 120, gets communicated over the drone communication link 122 to Drone Controller 110, and either gets streamed directly to each portable computing device 104, from the Drone Controller 110 (via optional communication link 124), or gets relayed to each portable computing device 104 through the CCS 102 via the exchanges of data 106. In this way, each user of each computing device 104 is enabled to (a) view the real-time first person video stream captured by the drone camera 115, and (b) provide real-time input through a user interface 224 on computing device 104, indicating a user intent with respect to the desired motion of the drone and/or control of the drone camera or other end effector.

Embodiments of the plurality of computing devices 104 and the interaction of the computing devices 104 with the CCS 102 are previously disclosed in the related patent applications, indicating the system and methods by which a plurality of distributed users, each of whom uses a computing device 104, is able to provide real-time input as part of a closed-loop control system, and thereby collaboratively express a unified intent as part of an emergent group intelligence. In the present disclosure, the unified intent, enables the plurality of users to express a singular desired motion (e.g. direction, speed, acceleration, altitude, orientation, or other dynamic characteristics) of the drone 105. In the present disclosure the unified intent may optionally enable the plurality of users to express a singular desired camera control (e.g. pan, tilt, and/or zoom) of the camera 115 on the drone 105.

More specifically, the collaboration system 100 comprises the Central Collaboration Server (CCS) 102 that is running the collaboration mediation application 112 and is in communication with the plurality of computing devices 104, each computing device 104 running the Collaborative Intent Application (CIA) 144, such that the plurality of individual users, each user interacting with one of the plurality of computing devices 104, can provide user input representing a user intent (i.e. the will of the user) with respect to a desired motion of the drone 105 (direction, position, speed, orientation, and/or altitude, etc . . . ) and/or a desired configuration of the camera (pan, tilt, and/or zoom). The plurality of user inputs is combined as a control system to result in a group intent, thus enabling collaborative control of the real-time graphical pointer 320, which enables the emergent will to control the drone 105.

Figure 2:
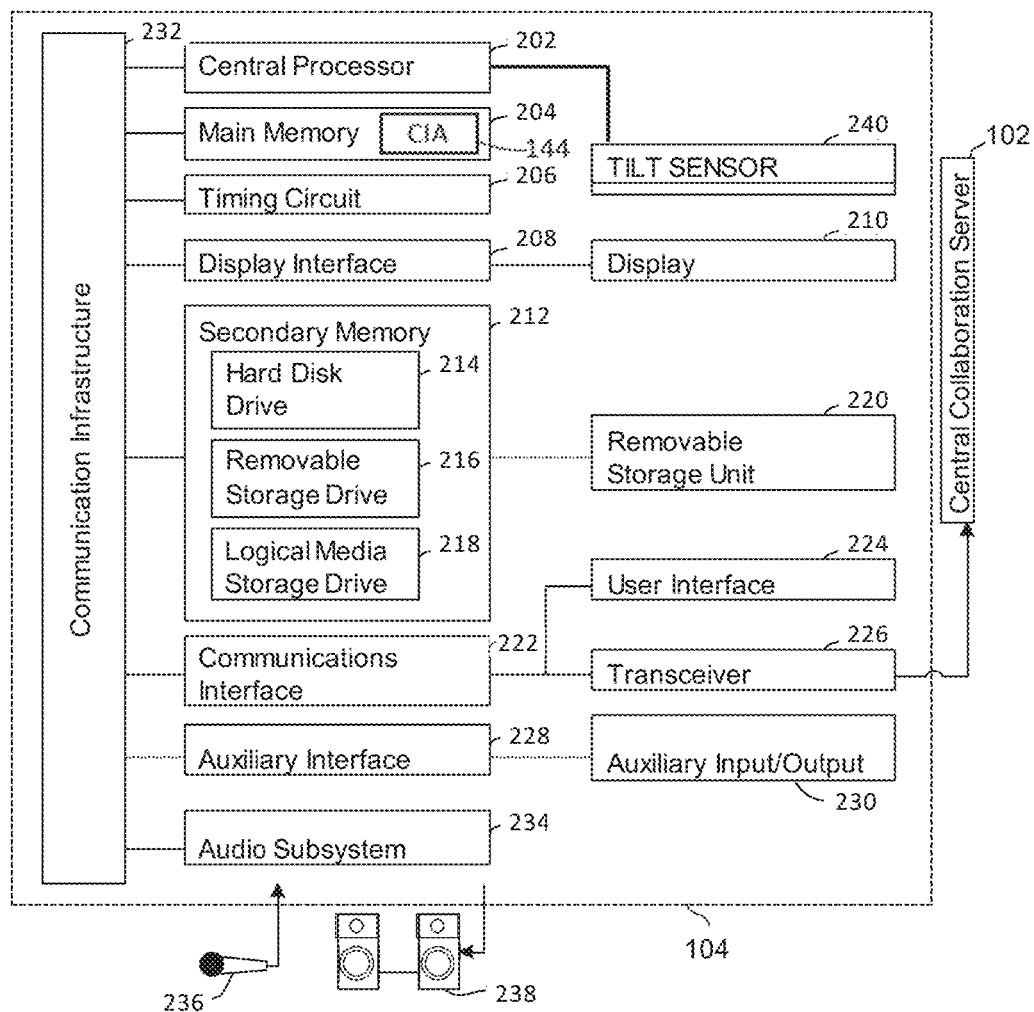
FIG. 2 is a schematic diagram of a computing device in one embodiment of the vehicle operation collaboration system.

Referring next to FIG. 2, a schematic diagram of the computing device 104 in one embodiment of the collaboration system is shown. Shown are a central processor 202, a main memory 204, a timing circuit 206, a display interface 208, a display 210, a secondary memory subsystem 212, a hard disk drive 214, a removable storage drive 216, a logical media storage drive 218, a removable storage unit 220, a communications interface 222, a user interface 224, a transceiver 226, an auxiliary interface 228, an auxiliary I/O port 230, communications infrastructure 232, an audio subsystem 234, a microphone 236, headphones 238, a tilt sensor 240, the central collaboration server 102, and the collaborative intent application 144.

As shown previously in FIG. 1, each of the plurality of computing devices 104, each used by one of a plurality of users (the plurality of users also referred to as a group), is networked in real-time to the central collaboration server (CCS) 102. In some embodiments, one of the computing devices 104 could act as the central collaboration server 142. For the purposes of this disclosure, the central collaboration server 102 is its own computer system in a remote location, and not the computing device 104 of one of the users. Hence the collaboration system is comprised of the centralized central collaboration server 102 and the plurality of computing devices 104, each of the computing devices 104 used by one user.

The computing device 104 may be embodied as a handheld unit, a pocket housed unit, a body worn unit, or other portable unit that is generally maintained on the person of a user. In other embodiments the computing device may be a generally stationary device such as a desktop computer or workstation. The computing device 104 may be wearable, such as transmissive display glasses.

The central processor 202 is provided to interpret and execute logical instructions stored in the main memory 204. The main memory 204 is the primary general purpose storage area for instructions and data to be processed by the central processor 202. The main memory 204 is used in the broadest sense and may include RAM, EEPROM and ROM. The timing circuit 206 is provided to coordinate activities within the computing device 204. The central processor 202, main memory 204 and timing circuit 206 are directly coupled to the communications infrastructure 232. The central processor 202 may be configured to run a variety of applications, including for example phone and address book applications, media storage and play applications, gaming applications, clock and timing applications, phone and email and text messaging and chat and other communication applications. The central processor 202 is also configured to run at least one Collaborative intent Application (CIA) 144. The Collaborative Intent Application 144 may be a standalone application or may be a component of an application that also runs upon other networked processors.

The computing device 104 includes the communications infrastructure 232 used to transfer data, memory addresses where data items are to be found and control signals among the various components and subsystems of the computing device 104.

The display interface 208 is provided upon the computing device 104 to drive the display 210 associated with the computing device 104. The display interface 108 is electrically coupled to the communications infrastructure 232 and provides signals to the display 210 for visually outputting both graphics and alphanumeric characters. The display interface 208 may include a dedicated graphics processor and memory to support the displaying of graphics intensive media. The display 210 may be of any type (e.g., cathode ray tube, gas plasma) but in most circumstances will usually be a solid state device such as liquid crystal display. The display 210 may include a touch screen capability, allowing manual input as well as graphical display.

Affixed to the display 210, directly or indirectly, may be the tilt sensor 240 (accelerometer or other effective technology) that detects the physical orientation of the display 210. The tilt sensor 240 is also coupled to the central processor 202 so that input conveyed via the tilt sensor 240 is transferred to the central processor 202. The tilt sensor 240 provides input to the Collaborative Intent Application 144. Other input methods may include eye tracking, voice input, and/or manipulandum input.

The secondary memory subsystem 212 is provided which houses retrievable storage units such as the hard disk drive 214 and the removable storage drive 216. Optional storage units such as the logical media storage drive 218 and the removable storage unit 218 may also be included. The removable storage drive 216 may be a replaceable hard drive, optical media storage drive or a solid state flash RAM device. The logical media storage drive 218 may be a flash RAM device, EEPROM encoded with playable media, or optical storage media (CD, DVD). The removable storage unit 220 may be logical, optical or of an electromechanical (hard disk) design.

The communications interface 222 subsystem is provided which allows for standardized electrical connection of peripheral devices to the communications infrastructure 232 including, serial, parallel, USB, and Firewire connectivity. For example, the user interface 224 and the transceiver 226 are electrically coupled to the communications infrastructure 232 via the communications interface 222. For purposes of this disclosure, the term user interface 224 includes the hardware and operating software by which the user executes procedures on the computing device 104 and the means by which the computing device 104 conveys information to the user. In the present invention, the user interface 224 is controlled by the CIA 144 and is configured to display information regarding the group collaboration, as well as receive user input and display group output.

To accommodate non-standardized communications interfaces (i.e., proprietary), the optional separate auxiliary interface 228 and the auxiliary I/O port 230 are provided to couple proprietary peripheral devices to the communications infrastructure 232. The transceiver 226 facilitates the remote exchange of data and synchronizing signals between the computing device 104 and the Central Collaboration Server 102. The transceiver 226 could also be used to enable communication among a plurality of computing devices 104 used by other participants. In some embodiments, one of the computing devices 104 acts as the Central Collaboration Server 102, although the ideal embodiment uses a dedicated server for this purpose. In one embodiment the transceiver 226 is a radio frequency type normally associated with computer networks for example, wireless computer networks based on BlueTooth® or the various IEEE standards 802.11.sub.x., where x denotes the various present and evolving wireless computing standards. In some embodiments the computing devices 104 establish an ad hock network between and among them, as with a BlueTooth® communication technology.

It should be noted that any prevailing wireless communication standard may be employed to enable the plurality of computing devices 104 to exchange data and thereby engage in a collaborative consciousness process. For example, digital cellular communications formats compatible with for example GSM, 3G, 4G, and evolving cellular communications standards. Both peer-to-peer (PPP) and client-server models are envisioned for implementation of the invention. In a third alternative embodiment, the transceiver 226 may include hybrids of computer communications standards, cellular standards and evolving satellite radio standards.

The audio subsystem 234 is provided and electrically coupled to the communications infrastructure 232. The audio subsystem 134 is configured for the playback and recording of digital media, for example, multi or multimedia encoded in any of the exemplary formats MP3, AVI, WAV, MPG, QT, WMA, AIFF, AU, RAM, Ra, MOV, MIDI, etc.

The audio subsystem 234 in one embodiment includes the microphone 236 which is used for the detection and capture of vocal utterances from that unit's user. In this way the user may issue a suggestion as a verbal utterance. The computing device 104 may then capture the verbal utterance, digitize the utterance, and convey the utterance to other of said plurality of users by sending it to their respective computing devices 104 over the intervening network. In this way, the user may convey a suggestion verbally and have the suggestion conveyed as verbal audio content to other users. It should be noted that if the users are in close physical proximity the suggestion may be conveyed verbally without the need for conveying it through an electronic media. The user may simply speak the suggestion to the other members of the group who are in close listening range. Those users may then accept or reject the suggestion using their computing devices 100 and taking advantage of the tallying, processing, and electronic decision determination and communication processes disclosed herein. In this way the present invention may act as a supportive supplement that is seamlessly integrated into a direct face to face conversation held among a group of users.

For embodiments that do include the microphone 236, it may be incorporated within the casing of the computing device 104 or may be remotely located elsewhere upon a body of the user and is connected to the computing device 104 by a wired or wireless link. Sound signals from microphone 236 are generally captured as analog audio signals and converted to digital form by an analog to digital converter or other similar component and/or process. A digital signal is thereby provided to the processor 202 of the computing device 104, the digital signal representing the audio content captured by microphone 236. In some embodiments the microphone 236 is local to the headphones 238 or other head-worn component of the user. In some embodiments the microphone 236 is interfaced to the computing device 104 by a Bluetooth® link. In some embodiments the microphone 236 comprises a plurality of microphone elements. This can allow users to talk to each other, while engaging in a collaborative experience, making it more fun and social. Allowing users to talk to each other could also be distracting and could be not allowed.

The audio subsystem 234 generally also includes headphones 238 (or other similar personalized audio presentation units that display audio content to the ears of a user). The headphones 238 may be connected by wired or wireless connections. In some embodiments the headphones 238 are interfaced to the computing device 104 by the Bluetooth® communication link.

The computing device 104 includes an operating system, the necessary hardware and software drivers necessary to fully utilize the devices coupled to the communications infrastructure 232, media playback and recording applications and at least one Collaborative Intent Application 144 operatively loaded into main memory 204, which is designed to display information to a user, collect input from that user, and communicate in real-time with the Central Collaboration Server 102. Optionally, the computing device 104 is envisioned to include at least one remote authentication application, one or more cryptography applications capable of performing symmetric and asymmetric cryptographic functions, and secure messaging software. Optionally, the computing device 104 may be disposed in a portable form factor to be carried by a user.

Figure 3:
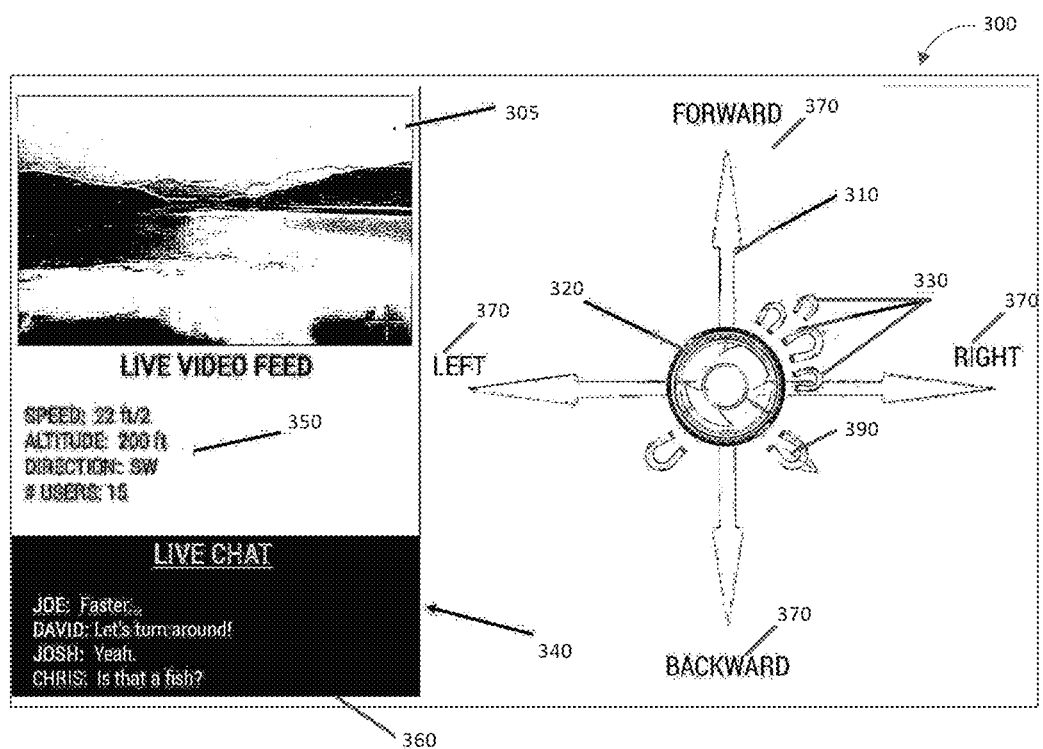
FIG. 3 is an exemplary user interface display of one computing device of the vehicle operation collaboration system.

Referring next to FIG. 3, an exemplary user interface display 300 of one computing device 104 of the drone control system 100 is shown in one embodiment of the present invention. Shown are a live video feed display 305, a first control axis 310, a second control axis 335, a collaboratively controlled graphical pointer 320, a plurality of user objects 330, a drone display area 340, a drone information area 350, a chat area 360, a plurality of axis labels 370, a user input area 380, and a user intent vector indication 390.

The Collaborative Intent Application (CIA) 144, running on each Portable Computing Device 104, presents the user of that computing device 104 with a unique interactive user interface display 300 which enables a shared experience with other users where each user can view the same live video feed from the drone 105 and collaboratively control the drone 105 by forming a closed-loop collective intelligence system. As shown in FIG. 3, the user interface display 300 includes the drone display area 340 which includes in the present embodiment the live video feed 305, the drone information area, and the chat area 360. The live video feed 305 presents substantially live video from the drone such that all users in the system can see the same substantially real-time view from the drone camera 115. As also shown, user interface display 300 optionally includes the a drone information area 350, which displays real-time data about the drone 105 and/or the collaborative group, such as including the speed, altitude, direction, and number of users currently participating in the real-time system 100. As also shown in FIG. 3, the user interface display 300 may optionally include the live chat area 360 wherein the participants can type and view chat comments, enabling text communication in near real-time among the participants.

As also shown in FIG. 3, the user interface display 300 includes the user input area 380, a unique implantation of the closed-loop swarm intelligence interface disclosed in the related patents by the present inventor which have been incorporated herein by reference. In this inventive embodiment, the user input area 380 includes the collaboratively controlled pointer 320. In the present embodiment, the pointer 320 is in the shape of a glass puck, although other graphic embodiments are contemplated. The location of the pointer 320 with respect to the control axes 310, 335 is received from the CCS 102 as determined from the input of the collective group.

Also shown in the user input area 380 are a pair of intersecting control axes 310, 335, intersecting at the midpoint of the axes 310, 335. As shown, the first control axis 310 depicts Forward-Backwards along a vertical axis (as indicated by axis labels 370), and the second control axis 335 depicts Left-Right along a horizontal axis (as indicated by axis labels 370). As also shown, each user in the system 100 associated with and enabled to manipulate (and thereby provide user input via) one user object 330 from the group of user objects 330, which in this case is an the shape or a magnet. The user objects 330 controlled by other users are optionally shown in real time. In the moment of time depicted in FIG. 3, each user object 330 location relative to the pointer 320 represents the user input of that user with respect to the collaboratively controlled pointer 320, indicating that user's intent with respect to the motion of the collaboratively controlled pointer 320.

In this way, the Collaborative Intent Application 144 on each computing device 104 presents the user interface display 330 on the screen of each Computing Device 104 such that each user can view and interact with the collaboratively controlled pointer 320 (or other graphical representation of the group intent) that is manipulated by the group to position the pointer 320 relative to the control axes 310, 335 to indicate a direction of motion of the drone 105, and a magnitude for that direction of motion that is translated into speed of the drone 105. In this way, if the real-time closed-loop system of users moves the collaboratively controlled graphical pointer 320 to a position on the control axes 310, 335, that position indicates if the drone 105 should move forward, back, left, right, or some combination thereof, and at what relative speed it should move in the forward, backward, leftward, rightward, or combinatorial direction.

The computing devices 104 are in communication with the CCS 102 as shown by the data exchanges 106 an FIG. 1. In some embodiments, such as a multi-tier architecture, the computing devices 104 may communicate with each other. The CCS 102 includes software and additional elements as necessary to perform the required functions. In than application, it will be understood that the term "CCS" may be used to refer to the collaborative mediation application 112 of the CCS 102 or other elements of the CCS 102 that are performing the given function.

By collaboratively moving the pointer 320, said plurality of users is enabled to impart real-time directional intent for the motion of the drone. The user input is expressed in real-time, at every time step, by each user manipulating the corresponding user object 330 (i.e. the graphical magnet) by using a touch screen or mouse or other appropriate controller. The user positions the user object 330 (i.e. magnet) at a location and orientation with respect to the collaboratively controlled pointer 320 (i.e. puck) and thereby indicates a user intent vector, including both a direction and magnitude of the user input. One exemplary user intent vector indication 390 is shown in FIG. 3 (for clarity, only one user intent vector indication is shown, but it will be understood that each user object 330 is associated with one user intent vector). The user intent vector can optionally be input by the user, for example, by tilting his or her computing device 104 in the desired direction. In other embodiments the user intent vector is optionally input by repeatedly swiping on a touch-screen at a direction, and at a swipe rate, that indicates the user intent vector. The user intent vector is communicated by the CIA 144 running on the user's computing device 104, to the Central Collaboration Server (CCS) 102. The CCS 102 receives the user intent vectors from the plurality of users, and then derives a group intent vector from the plurality of user intent vectors that represents the collective will of the group at that time step.

The group intent vector is then used to compute an updated location of the pointer 320 with respect to the control axes 310 335. This updated location is translated into a signal for controlling the drone 105. The further the pointer 320 is along one axis, the faster the drone 105 is commanded to move in the direction that corresponds to that axis. So, the further away from the origin of the control axes 310 335 that the puck 320 moves along the direction of the first control axis 310 towards the axis label 370 labeled "FORWARD", the faster the drone 105 moves in the forward direction. Similarly, the further from from the origin of the control axes 310 335 that the puck 320 moves along the second control axis 335 towards the axis label 370 labeled "RIGHT", the faster the drone 105 is commanded to move in the rightward direction. It should be noted that the axes 310 335 shown are relative to the first-person view presented by the camera 115. In other embodiments, the control axes 310 335 can be configured in ordinal directions such as NORTH, SOUTH, EAST, or WEST. It should also be noted that because the axes 310 335 are two-dimensional, the real-time closed-loop system of users can position the collaboratively controlled pointer 320 to locations on the Control Axes 310 335 that simultaneously indicate a speed in two different directions at once, thus giving a vector direction. For example, if the puck 320 is moved to a position that is away from the origin towards both the FORWARD and RIGHT axes labels 370 at once, the relative distance of the collaboratively controlled pointer 320 from the origin in the FORWARD direction will indicate a speed of the puck 320 in the forward direction, while the relative distance of the collaboratively controlled pointer 320 from the origin in the RIGHT direction will indicate a speed of the drone 105 in the rightward direction. In this way, the group intent can indicate that the drone 105 should move FORWARD and to the RIGHT, with a speed indicated by how far along each axis 310 335 the group has positioned the puck 320 by working together as a real-time collective intelligence.

As previously shown in FIG. 1, the system 100 comprises the Central Collaboration Server 102 ("CCS") that's in communication with the plurality computing devices 104, each of said computing devices 104 running the Collaborative Intent Application ("CIA") 144. The system 100 is designed to enable a plurality of users, each engaging an interface of one of said computing devices 104, to jointly control the single graphical pointer 320 through real-time group-wise collaboration. The graphical pointer 320 (also referred to as a puck) is displayed to each user by the CIA 144 running on his or computing device 104, as coordinated by data received from the CCS 102 over the communication links 106. Each of the computing devices 104 comprises one or more processors capable of running the CIA routines and displaying a representation of the pointer 320 along with a plurality of other graphics. The computing device 104 could be, for example, a personal computer running the CIA 144 or a smart phone or tablet running the CIA 144. The CIA 144 can be a stand-alone executable or be code that executes inside a web-browser or other shell.

The CIA software 144 running on each computing device 104 is configured to display a graphical user interface (also referred to as a user interface display or a decoupled control interface) that includes at least one graphical pointer 320 and a plurality of graphical indications for user choices (referred to some embodiments as input choices or answer choices). In some embodiments, the graphical pointer 320 is configured to look like a "puck" with a central viewing area that is partially transparent. In the present embodiment, in lieu in individual input choices, the control axes 310, 335 are used to indicate user input choices. When the pointer 320 is positioned over a location with respect to the control axes 310, 335 for more than a threshold amount of time, a value associated with that location is selected for each of the control axes 310, 335. These values are then translated into a command sent by the CCS 102 to the Drone Controller 110, indicating the desired motion of the drone 105, based on the location of the collaboratively controlled puck 320 on the control axes 310, 335. In response The Drone Controller 110 then sends a corresponding command to the drone 105, which is processed by the local controller 220 on the drone 105, which then modulates the drone actuators (motors controlling propellers) to be responsive to commands from the CCS 102. In this way, the real-time collective intelligence of users of the plurality of computing devices 104, can work together as a system to position the puck 320 on the control axes 310, 335, and thereby send commands to the drone 105 that correspond with the desired speed and direction indicated on the control axes 310, 335. In other embodiments, a third axis can be used to also indicate orientation of the drone 105 based on the position or orientation of the controlled graphical puck 320 on the control axes.

As described in detail in the aforementioned related patent applications, the CIA 144/CCS 102 software enables the group of users to each impart their own individual input so as to collaboratively control the motion of the graphical pointer 320, said pointer 320 moving under group-wise control. In a preferred embodiment of the present invention, a physically intuitive metaphor is employed such that the pointer 320 is assigned a simulated mass and a simulated damping (friction) with respect to the control axes 310. Each user is told that their personal user input acts to apply a simulated force upon the group-wise pointer 320. This is represented as the user intent vector described in the related applications. The user intent vector can be applied by manipulating a user object 330, such as the graphical magnet 330, each of which is freely controllable in real-time by the corresponding user, enabling the user objects 330 to be positioned and oriented with respect to the pointer 320. The pointer 320 then moves in response to an intelligent summation of the applied forces. In some embodiments, artificial gravity is also applied to the puck 320, pulling the puck 320 back to the center of the control axes. The gravitational force is thus part of the physical system that also includes the user intent vector forces. The vector sum can be a simple vector addition in which each user input is counted equally, or it can be a weighted sum (or average) in which the input from some users has more impact than others. As described in the related applications, the weighting process can be based on user scores earned during previous sessions or based on real-time behavioral characteristics. In some embodiments, as disclosed in related patent application Ser. No. 15/898,468 by the present inventor, the weighting factors can be computed based on predictive measures of user confidence and can be optimized using Machine Learning techniques.

Thus the intuitive conceptual model is provided to users wherein the plurality of user force vectors are applied to the pointer 320 based upon input conveyed by each user into their individual computing device 104. This is achieved by computing and imparting the group force vector upon the pointer 320 that is an intelligent summation or average of the user input force vectors. The computing and imparting is performed the CCS 102 which collects the real-time input from the users, computes the resultant vector, and applies it to a physics-based model controlling the graphical movement of the displayed pointer 320 with respect to the control axes 310, 335. The physics-based model considers a pointer mass, a environmental damping coefficient, and a current vector motion (velocity and acceleration) of the pointer 320, and determines an updated vector motion of the pointer 320 resulting from the current group force vector.

Because the users are continually providing user inputs, the group force vector is repeatedly calculated at time steps faster than human perception can detect. At similar speeds, the group force vector is repeatedly applied and the vector motion of the pointer 320 repeatedly updated. This creates a seamless closed-loop control system connecting all of the participating users. In some embodiments, this is performed at rates in which updates are performed every 100 milliseconds, with a lag of less than 25 milliseconds. In many such embodiments pointer motion is interpolated between updates based on the physics model. Even when no forces are applied by the users, the pointer 320 generally maintains momentum and will continue to move for a period of time before stopped by damping. This enables a smooth and intuitive system wherein participants connected from around the world can work together in synchrony to control the pointer 320, and thereby control the drone 105, together as a unified intelligence.

Providing the intuitive conceptual model for group-wise control of the single pointer 320 is helpful, but smooth and seamless operation has required an intuitive graphical user interface and control methodology. The challenge of the pointer interface is that unlike traditional user interfaces where a user's action has a direct and apparent impact on the object they are intending to control (e.g. the pointer 320), this collaborative system 100 is such that the motion of the pointer 320 is not based on the user's own input but is based on the group input. Because of this, the user may impart a desire for the pointer 320 to move left at a given moment, but if the group intent is determined from the group of users as a desire for the pointer 320 to move right, the pointer 320 will move right. Thus, a significant need exists for intuitive graphical user interface methodologies that allow the individual user to see a result of his or her input, while also making the overall physical metaphor as clear and simple and intuitive as possible. More specifically, there is a substantial need to create a new type of user interface that intuitively connects but also substantially decouples the representation of each user's personal input from the motion of the collaborative controlled pointer 320. Some embodiments of intuitive graphical user interface methodologies have been described in the related patent applications.

Figure 4:
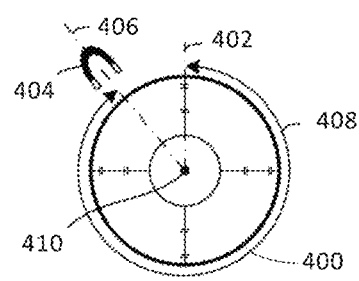
FIG. 4 is an exemplary graphical magnet pointer of the interface display in accordance with one embodiment of the present invention.

Referring next to FIG. 4, as previously disclosed in related patent application Ser. No. 14/738,768, a graphical representation of a graphical magnet pointer interface 900 is shown in one embodiment of an intuitive graphical interface methodology. Shown are a pointer 400, a pointer vertical axis 402, a magnet icon 404, a magnet axis 406, an angle 408, and a pointer center 410. The pointer 400 may be an example of, or incorporate aspects of, the pointer 320 as described with reference to FIGS. 3 and 9-15. The magnet icon 404 may be an example of, or incorporate aspects of, magnet icons 330 as described with reference to FIGS. 3, 10-13, 15 and 16.

The graphical magnet pointer interface illustrated in FIGS. 4-7 is a methodology for user input that supports a physically intuitive model for group-wise control of the graphical pointer 400. It employs the magnet icon 404 that is provided to each user for display on their computing device 104 (as controlled by the instance of the CIA 144 software running on the user's computing device 104). In the embodiment shown, the magnet icon 404 is a "U" shaped magnet icon, but other types of magnet icons can be used, and/or other elements that graphically represent a physical pull force. In this way, each user can see his own magnet icon 404 on his own screen, said magnet icon 904 being directly responsive to the user input provided by said user. Because the control of the magnet icon 404 is handled locally by the computing device 104, the graphical magnet pointer interface is highly responsive and not impacted by communication lag with the CCS 102, thus allowing each user to feel like he has a high-bandwidth highly responsive link into the system 100. The position of the magnet icon 404 on the user's interface display (for example the exemplary user interface display 300) may be controlled by a mouse coupled to the computing device 104 and operated by the user, with a conventional mouse arrow icon changing to the magnet icon 404 when the mouse cursor nears the graphical pointer 400 that is also displayed on the user interface display. The magnet icon 404 is displayed at the location of the mouse arrow icon, but is configured in the software to always point towards the center 410 of the circular pointer 400. Thus as the magnet icon 404 approaches the pointer 400, the magnet icon 404 appears to aim at the pointer center 410 as if the magnet icon 404 is magnetically attracted to the pointer 400.

In addition, the CIA 144 software controlling the magnet icon 404 may be configured to increase a size of the magnet icon 404 as the magnet icon 404 moves closer to the pointer 400, corresponding to a larger "magnetic" force between the magnet icon 404 and the pointer 400. Thus, with a very intuitive graphical metaphor, the user understands without instruction that he can apply a virtual pull force on the pointer 400 (representing his user intent vector) that aims from the pointer center 410 to the location of the cursor (i.e. the magnet icon 404) controlled by the mouse.

As shown in FIG. 4, the CIA 144 software can be configured on each computing device 104 to display the graphical magnet icon 404 at the cursor location controlled by the user's mouse, trackpad, trackball, touchscreen, or other means for user input of the computing device 104. The magnet icon 404 is configured to appear only when the user's cursor location is within threshold proximity of the group-controlled pointer 400, for that means the user intends to convey user input regarding his personal intent as to which direction the pointer 400 should move. The magnet icon 404 is configured to automatically point towards the pointer center 410, as if magnetically attracted to it. This conveys an intuitive feeling to the user that by positioning the magnet icon 404 near the pointer 400, he is applying the magnetic pull on the pointer 400. The CIA 144 software then sends the user intent vector to the CCS 102 indicating the angle 408 of the magnetic pull. In the embodiment shown in FIG. 4, the longitudinal magnet axis 406 of the magnet icon 404 is the axis of symmetry of the singly-symmetric magnet icon 404. The angle of direction is the clockwise angle 408 between the pointer vertical axis 402 and the magnet axis 406. In the example shown in FIG. 4, the angle 408 is approximately 330 degrees.

In some embodiments, magnitude of the user input can be graphically conveyed by how close or far the user positions the magnet icon 404 to the pointer 400. The closer the magnet icon 404 to the pointer center 410, the stronger the magnitude of the user input (i.e. the "magnetic force"). To make this visually intuitive, the magnet icon 404 increases in size as the magnet icon 404 moves closer to the pointer center 410. Once the magnet icon 404 overlaps the pointer 400, the magnet icon 404 may be limited from getting too close the pointer center 410 (i.e. from covering a central targeting area of the pointer 400). Thus the magnet icon 404 appears when the input cursor gets within certain proximity of the pointer 400, increases in size as the cursor nears the pointer 400, and disappears if the cursor gets too close to the pointer center 410, the magnet icon size increasing as the magnet icon 404 moves closer to the pointer center 410.

Figure 5:
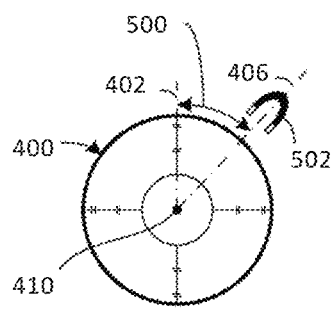
FIG. 5 comprises the exemplary graphical magnet pointer with a magnet icon in a first position.
Figure 6:
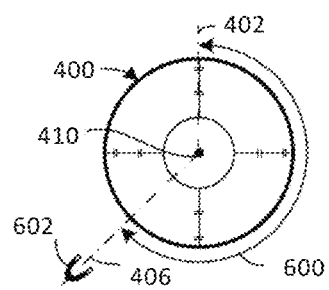
FIG. 6 comprises the exemplary graphical magnet pointer interface with the magnet icon in a second position.
Figure 7:
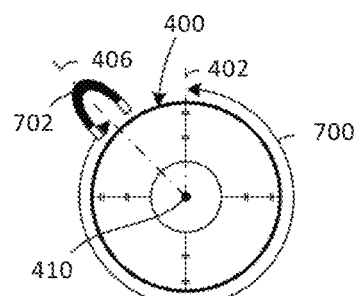
FIG. 7 comprises the exemplary graphical magnet pointer with the magnet icon in a third position.

Referring next to FIGS. 5-7, exemplary magnet icon pointer configurations are shown. Shown in FIG. 5 is a first magnet pointer configuration. Shown in FIG. 6 a second magnet pointer configuration, and shown in FIG. 7 a third magnet pointer configuration. FIGS. 5-7 show example configurations of the magnet icon 404 and associated pointer 400 at various points in time. The pointer 400 will be moving across the display 210 (for example, the user interface display 300 of FIG. 3) based on the group intent as determined by the CCS 102 and sent to each computing device 104 to be displayed on the display 210 by the CIA 144. The magnet icon 404 is controlled by the user input in conjunction with the CIA software residing on the computing device 104, the magnet icon 404 representing the desired magnitude (size of magnet) and direction (position/orientation of magnet) of the user intent. Based on the magnitude/direction/position of the magnet icon 404 with respect to the pointer 400, the CIA 144 software sends the user intent vector to the CCS 102 for use in deriving the next group intent.

As shown in FIG. 5, a first magnet icon 502 has a medium size compared to a second magnet icon 602 of FIG. 6 and a third magnet icon 702 of FIG. 7. This indicates a medium magnitude of intent. The first magnet icon 502 has been located by the user in a direction as defined by the first angle 500, shown to be approximately 50 degrees.

As shown in FIG. 6, the size of the second magnet icon 602 is smaller than the first magnet icon 502 and the third magnet icon 702, indicating a relatively small magnitude of user intent. The second magnet icon 602 has been located by the user in a direction defined by the second angle 600, shown to be approximately 230 degrees.

As shown in FIG. 7, the size of the third magnet icon 702 is larger than the first magnet icon 502 and the second magnet icon 602, indicating a relatively larger magnitude of user intent. The third magnet icon 702 has been located by the user in a direction defined by the third angle 700, shown to be approximately 310 degrees. The CCS 102 sums the user intent vectors from the plurality of users, computes the group intent vector, uses the group intent vector to apply the group force vector to the simulated physical model of the pointer 400 (mass, damping, etc . . . ), and based on the physics model sends the pointer coordinate information to each computing device 104, each of which are then updated with the new location of the pointer 400.

The result is the satisfying, intuitive, informative, and fun method by which individual users can convey their intent/will upon the graphical pointer 400 that is being controlled not by them individually, but by the group of users who are all applying real-time synchronous control input.

As described previously, some embodiments weight the input from all users equally. In such embodiments, the magnet icons 404 displayed for all individual users can employ the same mapping between size and distance to the pointer 400. However, for embodiments that weight users differently, magnet size can be scaled accordingly. In this way, the user who is being granted a higher contribution rate to the group due to earning points, can see a larger magnet icon 404 on their screen than the user who has been granted a lower contribution rate to the group. This provides visual intuition.

In general, users only see their individual magnet icon 404 on their screen. In some embodiments, however, the system 100 can be configured to allow the user to see a representation of the magnets controlled by other users. In such embodiments "ghost magnet" icons representing user inputs from other users are employed. The ghost magnet icons may be partially transparent, thus making the ghost magnet icons easily distinguishable from the user's own magnet icon, and thus preventing the ghost magnet icons from obscuring other important elements on the display 210. If the user is collaborating along with 100 other users, the user might thus see one solid magnet icon 404 (under his own control) and 99 ghost magnet icons that represent the real-time user input being conveyed by the other users. The ghost magnet icon for one of the other users would only appear when that user is positioning his mouse near the representation of the pointer 400 on his display 210. The ghost magnet icons in some embodiments may resemble a swarm of bugs hovering around the pointer 400. When all ghost magnet icons are evenly distributed around the pointer 400 (accounting for both magnitude and direction), the net effect cancels out and the pointer 400 does not move. But as the group converges upon a unified sentiment, a majority of the magnet icons would be seen to group themselves on one side of the pointer 400, and the pointer 400 will move. Such a display helps to convey the group-wise behavior of the users which in many ways emulates swarms of bugs or flocks of birds. The ghost magnet paradigm is a graphical representation of this swarm-like behavior.

While the graphical magnet interfaces as shown in FIGS. 4-7 uses cursor control interfaces such as mice, touchpads, trackballs, and touchscreens, a number of unique tilt control input methods can be employed as disclosed in the related applications incorporated herein by reference.

As disclosed previously, an artificial restoring force is applied to the puck/pointer 400 in many inventive embodiments, pulling the puck 400 back to the center of the control axes in resistance to the pull of the magnets of the users. This restoring force may be modeled as a linear spring force, a non-linear spring force, a gravitational well that increases the restoring force level with distance from the origin. In some embodiments a graphical representation of the restoring force is shown on the user interface display.

Figure 8:
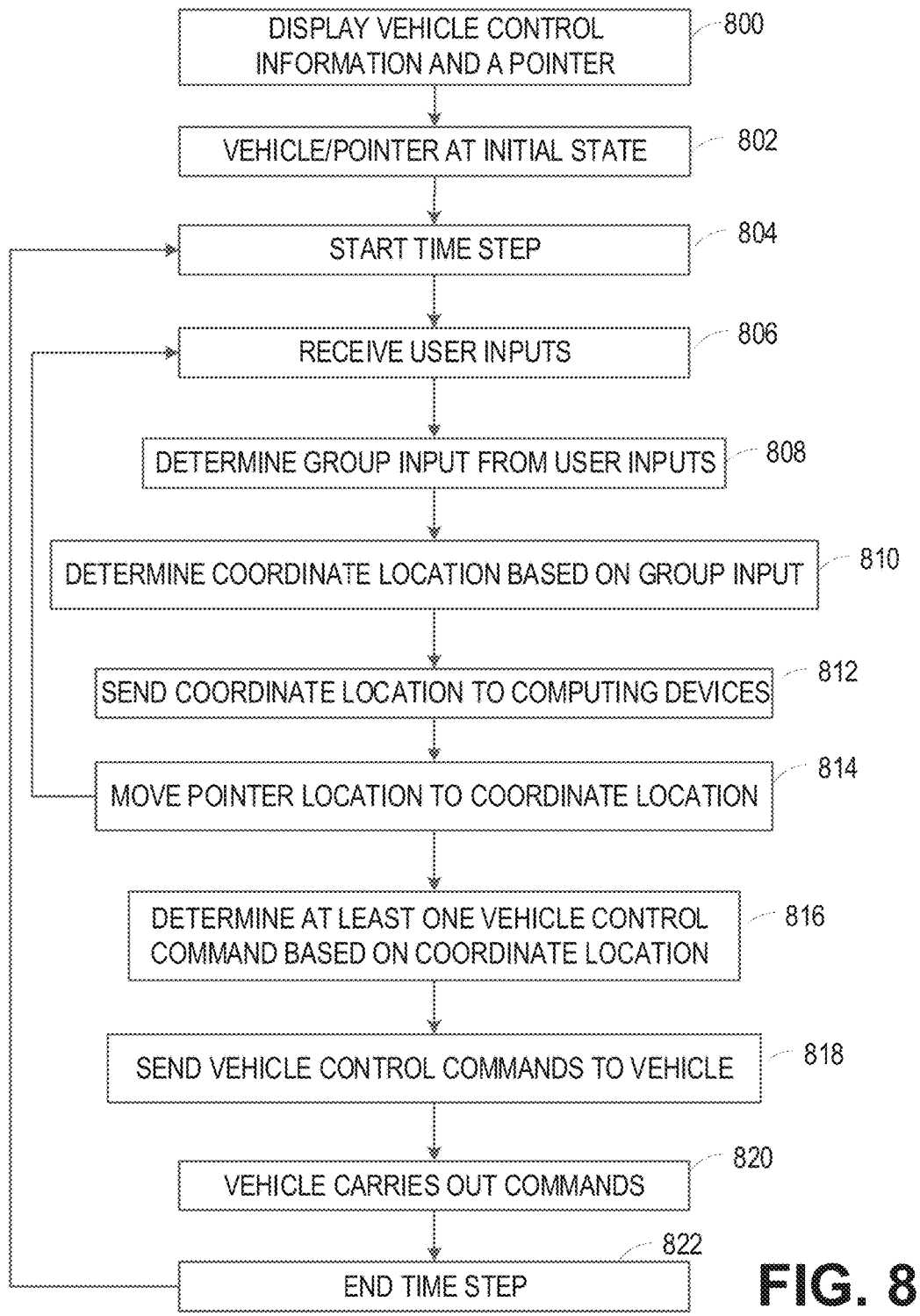
FIG. 8 is a flowchart of a method for real-time collaborative control of a vehicle using a vehicle operation collaboration system

Referring next to FIG. 8, a flowchart of a method or real-time collaborative control of a vehicle using a vehicle operation collaboration system (such as the collaboration system 100 shown in FIG. 1) is shown.

In the first display information and pointer step 800, the CCS 102 sends information to the plurality of computing devices 104 such that an input display (for example the interface display 300 of FIG. 3) is shown on each computing device. The display includes a collaboratively controlled graphical pointer indication (such as the pointer 320 shown in FIG. 3). Other vehicle control information is shown such that locating the pointer in relation to the vehicle control information corresponds to one or more commands that can be send to the vehicle (or devices attached to and controlled via the vehicle, such as a camera). In the exemplary interface display 300 of FIG. 3, the vehicle control information includes the first control axis 310 representing vehicle commands for forward/backwards motion, and the second control axis 335 representing device commands for left/right vehicle motion.

In the next initial state step 802, the pointer location on the display and the vehicle are at an initial state. In the embodiment shown in FIG. 3, the initial state of the pointer is at the intersection (origin) of the normal control axes).

In the next start time step step 804, one vehicle command collaborative time step is begun. As previously described, the pointer update time step length may be different from the drone update time step length. In other embodiments the time steps may be of the same length or the drone time step may be shorter than the pointer update time step.

The method proceeds to the receive user inputs step 806, the beginning of the pointer update loop. During the receive user inputs step 806, each computing device 104 receives an input associated with a desired location of the pointer (which in turns corresponds to a desired motion of the vehicle). Typically, the user input will comprise a user input vector including a magnitude and a direction.

In the next determine group input step 808, each computing device 104 sends the user input to the central collaboration server 102. The central collaboration server determines from all user inputs a single group input representing the combination of all user inputs. In some embodiments the group input comprises a group input vector having a direction and a magnitude.

In the next determine coordinate location step 810, the CCS 102 determines a coordinate location based on the group input. The coordinate location is sent to each computing device 104 in the send coordinate location to computing devices step 812.

In the move pointer location step 814, in response to receiving the coordinate location, each computing device updates the pointer location based on the coordinate location, therefore representing on each computing device 104 the combined group result determined from the plurality of user inputs. The process then returns to the receive user inputs step 806, and continues to loop through the pointer update steps 806, 808, 810, 812, 814. At certain times the process will continued to the determine vehicle control commands step 816 for the process of sending commands to the vehicle.

In the next determine vehicle control commands step 816, the CCS 102 determines at least one vehicle command from the coordinate location. In the embodiments shown in FIGS. 9-12, the direction of motion of the drone 105 is determined by the coordinate location as represented by the pointer 320 and the speed of the drone 105 is determined by the distance of the pointer 320 from each of the control axes 310, 335 (for example, the forward distance 1200 and the rightward distance 1202 shown below in FIG. 12). In the next send vehicle commands step 820, the CCS 102 sends the command(s) to the drone controller 110, which in turn sends the command(s) to the drone 105. Then, in the next vehicle carries out commands 820, the vehicle performs according to the received commands.

In the last end time step step 822, the method. returns to the start time step step 804, and the process repeats in continuous loops, with the users providing inputs and the CSS 102 determining drone commands and updated pointer locations from combining the user inputs into a single group input. Examples using this general method are shown below in FIGS. 9-17.

Referring next to FIGS. 9-12, exemplary user interface displays 900 of one computing device 104 of the drone control system 100 are shown at sequential points in time while a group of users is collaboratively controlling the pointer 320 as a unified system in one embodiment of the present invention. Shown are the first control axis 310, the second control axis 335, the collaboratively controlled graphical pointer 320, the plurality of user objects 330, the plurality of axis labels 370, and an origin 902.

Figure 9:
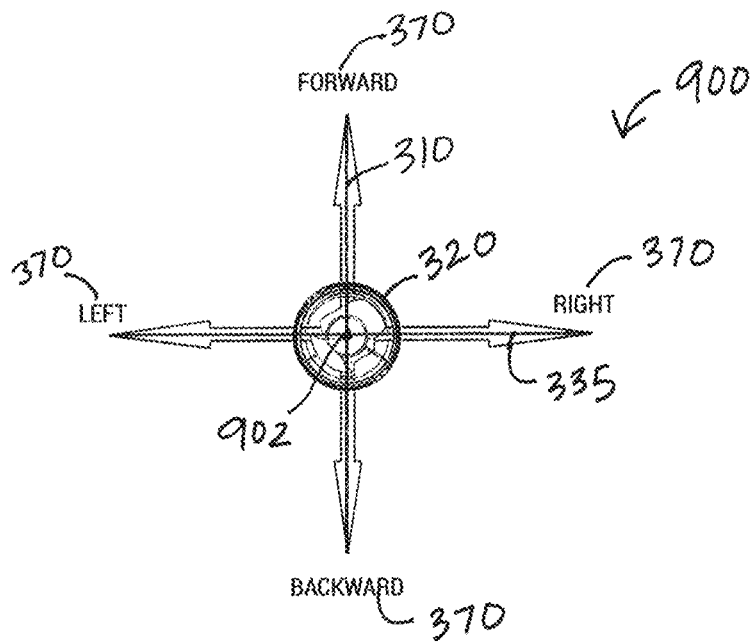
FIGS. 9-17 are exemplary user interface displays of one computing device of the vehicle operation collaboration system during collaborative control of the vehicle.

In FIG. 9, an initial point in time is shown while the drone 105 is at an initial position and the puck 320 is at the center of the control axes 310, 335. This is a starting position wherein the control values are 0,0 (i.e. there is no movement along either axis 310, 335), and thus the drone is currently being told to remain at a fixed location.

As described above, however, the graphical puck 320 is under collaborative control from the plurality of networked users, the users able to work as a system to move the puck 320 upon the control axes 310, 335 and therefore guide the drone in two degrees of freedom—forward/back and left/right—where the speed in each degree of freedom is a function of the displacement of the puck 320 with respect to the control axes 310, 335. As also mentioned above, additional degrees of freedom may be employed, for example an elevation axis (up/down).

Figure 10:
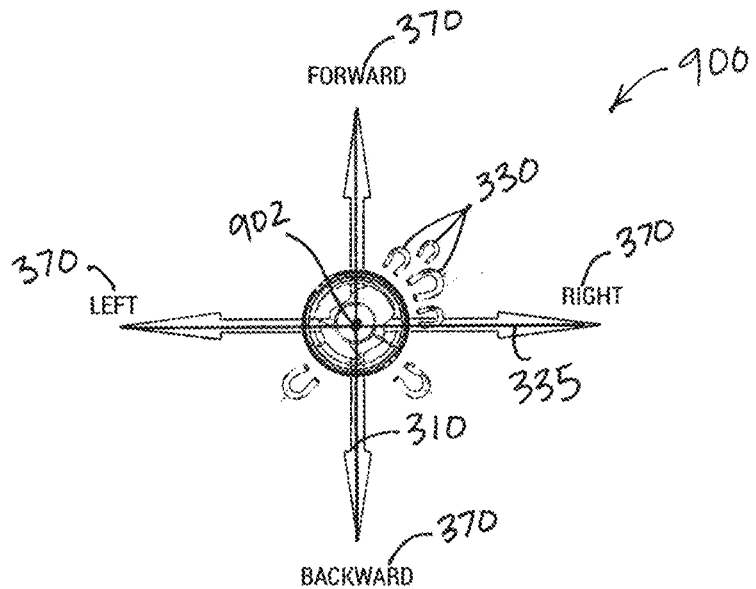
Figure 11:
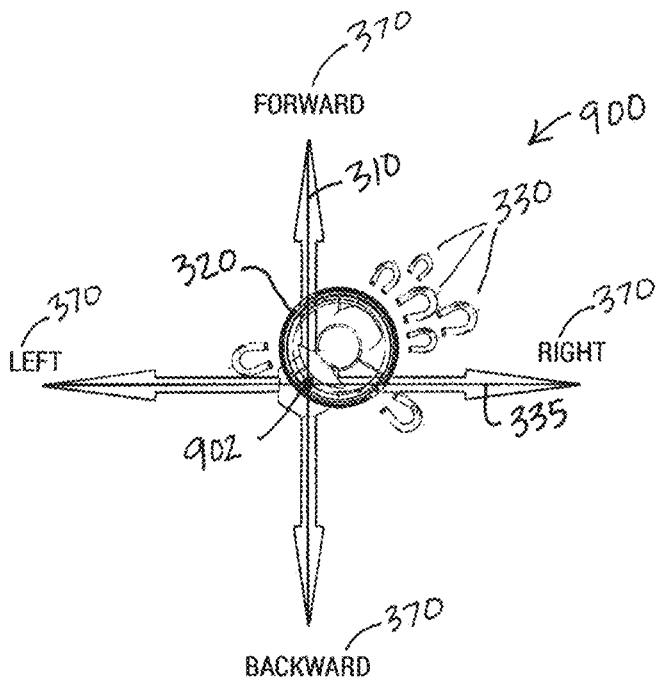
Figure 12:
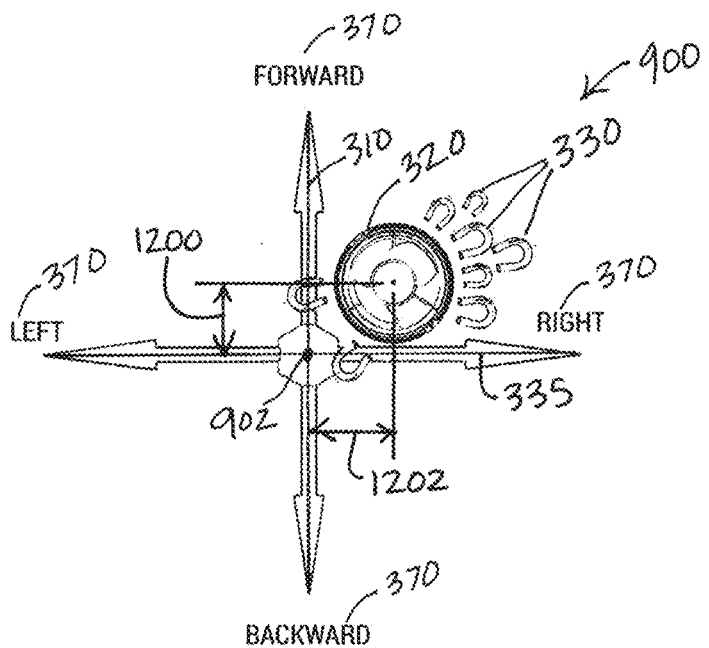

As described above, users collaboratively control the puck 320 using graphical magnets icons that act, as part of a dynamic system. Referring to FIGS. 10-12, three sequential times step are shown in which the puck 320 is being roved with respect to the control axes 310, 335 by the plurality of networked users controlling individual user objects 330 (shown as magnet icons in these examples) on their computing devices 104.

As shown in FIG. 10, each user positions his user object 330 around the puck 320 and impart the individual user force vectors. The puck 320 may also have a gravitational (or spring) restoring force bringing it back to center. Thus the users must overcome the restoring force to move the puck 320 away from the origin. This is a highly valuable inventive embodiment because the center position is one in which the drone stays still. Thus if users are not applying sufficient net force on the graphical puck 320, the drone hovers in place, as shown in FIG. 10.

If the users apply a sufficient force to overcome the restoring force, the puck 320 will move away from the origin, as shown in FIG. 11, resulting in movement commands being sent to the drone 105 as previously described.

As the users continue to supply input, the puck 320 may move even further from the origin as shown in FIG. 11. In FIG. 11, the puck 320 is positioned such that the puck position corresponds with both FORWARD motion along the first control axis 310 and and RIGHTWARD motion along the second control axis 335. The Central Collaboration Server 102 will send commands to the Drone Controller 110 based on the changing position of the graphical puck 320 under real-time collaborative control. At the moment shown in FIG. 12, the commands sent by the CCS 102 to the Drone Controller 110 will indicate that the drone should move FORWARD and RIGHTWARD, at a forward speed proportional to a forward distance 1200 equal to the distance between a center of the puck 320 and the origin along the first control axis 335, and a rightward speed proportional to a rightward distance 1202 between the center of the puck 320 and the origin along the first control axis 310. In this way, a group of distributed and networked users can work together to collaboratively control both the direction and speed of the drone 105 in multiple degrees of freedom.

Figure 13:
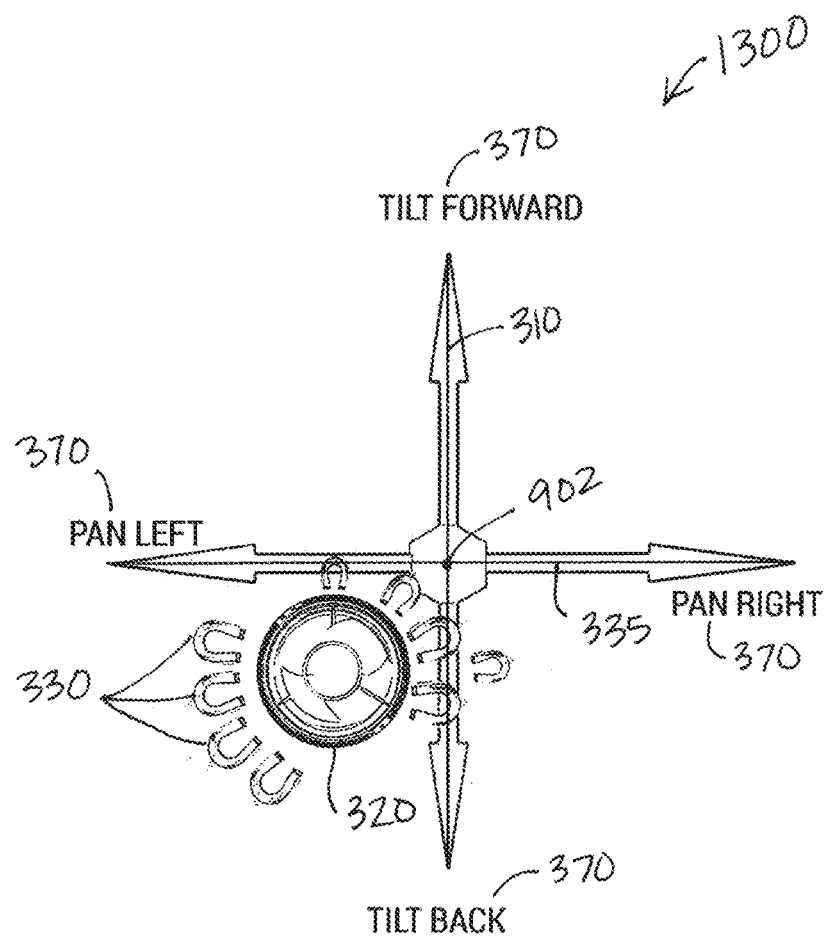

Referring next to FIG. 13 an exemplary user interface display 1300 of one computing device 104 of the drone control system 100 during a time while a group of users is collaboratively controlling the pointer 320 as a unified system is shown in another embodiment of the present invention. Shown are the first control axis 310, the second control axis 335, the graphical pointer 320, the plurality of user objects 330, the plurality of axis labels 370, and the origin 902.

As shown, the control axes 310, 335 can be employed for controlling the camera pan, tilt, and zoom. An example is shown in FIG. 13. The first control axis 310 results in commands for forward/rearward tilting of the drone camera 155, as displayed for the user by the axis labels 370 "TILT FORWARD" and "TILT BACK". The second control axis 335 results in commands for panning left and right of the drone camera 155, as displayed for the user by the axis labels 370 "PAN LEFT" and "PAN RIGHT".

While FIG. 13 only corresponds to PAN and TILT control, alternative axes can be employed by the present invention, for example collaborative ZOOM control. In addition, collaborative selection of options such as "RECORD" or "SNAPSHOT" may also be employed by the present invention.

The examples given thus far have enabled a swarm or users to control a drone through an interface that gives relative motion commands—direction and speed—in multiple degrees of freedom. In other embodiments of the present invention, direct POSITION CONTROL can be enabled in a 2 dimensional area or 3 dimensional space. We will use the 2 dimensional area for illustrative purposes, but the same inventive methods and systems can be used for additional dimensions of control.

Figure 14:
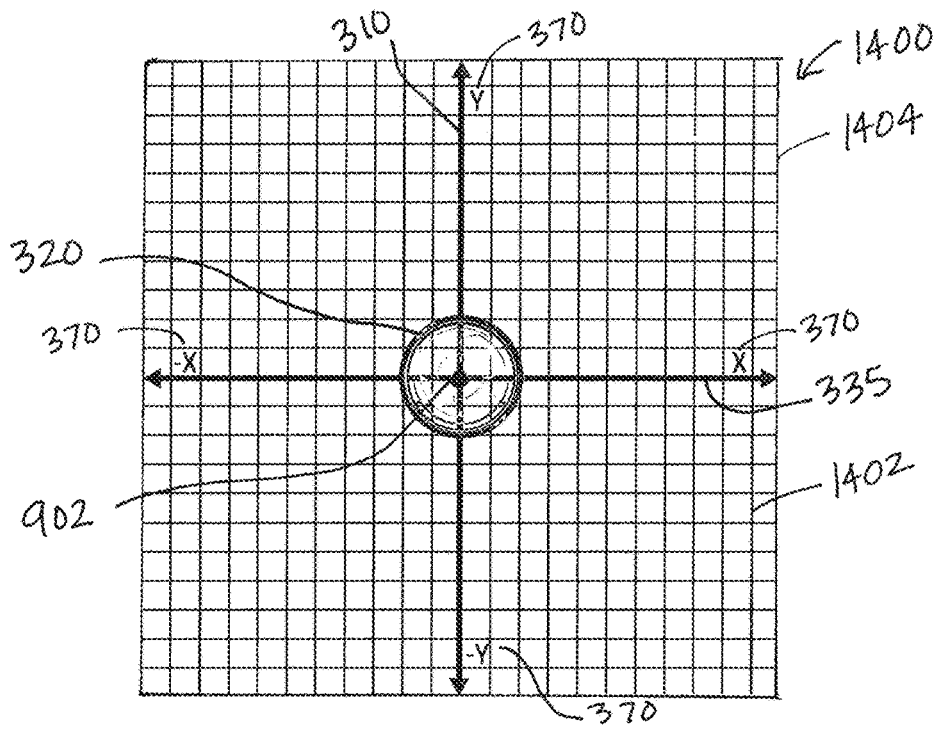

Referring next to FIG. 14, an exemplary user interface display 1400 of one computing device 104 of the drone control system 100 at a starting point in time while a group of users is collaboratively controlling the pointer 320 as a unified system is shown in another embodiment of the present invention. Shown are the first control axis 310, the second control axis 335, the graphical pointer 320, the plurality of axis labels 370, and the origin 902, a grid 1402, and a control area 1404

FIG. 14 shows an alternate interface display in which the collaboratively controlled graphical pointer 320 (i.e. puck) is displayed on the two-dimensional control area 1404 (depicted as a set of X and Y coordinates) that represents the position of the drone 105 in a real two-dimensional plan area in the physical world. The scaling of the control area 1404 can be configured as adjustable or fixed. This representation is shown on the portable computing device 104 of each user in the collaborative real-time control system, as generated by the Collaborative Intent Application (CIA) 144 running on the portable computing device 104 and in communication with the collaborative control software 112 running on the Central Collaboration Server 102. In one embodiment, the two-dimensional control area 1404 overlaid by the grid 1402 in FIG. 14 represents a 200 ft. by 200 ft. plan space over a large field (for example a football field) that the drone is hovering over. The origin 902 of the grid 1402 in FIG. 14 corresponds with the center of that 200 ft by 200 ft physical space and is the starting location of the drone 105 when the session starts.

As shown in FIG. 14, at the starting time the puck 320 is positioned at the origin 902 of the grid 1402. Then, using the collaborative control methods disclosed herein, each user off the portable computing device 104, while watching a live video feed from the drone 105, expresses their real-time individual intent by repeatedly updating their desired PULL on the puck 320 using the magnet method disclosed previously in FIGS. 4-7 and in related patents that have been incorporated by reference (for example, the screen-swipe method intended for mobile phones). The CCS software 112 closes the loop around the plurality of users, repeatedly updating the location of the collaboratively controllable pointer (puck) 320 with respect to the two dimensional control area 1404 shown in FIG. 14. The location of the puck 320 within the area 1404 is then translated into the control signal 114 to be sent by the CCS 102 to the Drone Controller 110, the control signal indicating a repeatedly updated target position for the drone 105 within the real-world physical space, the target position a scaled representation of the position of the graphical puck 320 within the control area shown in FIG. 14. In this way, as the group of users moves the puck 320 as a real-time collective intelligence system, the drone 105 will move within the real-world physical space.

Figure 15:
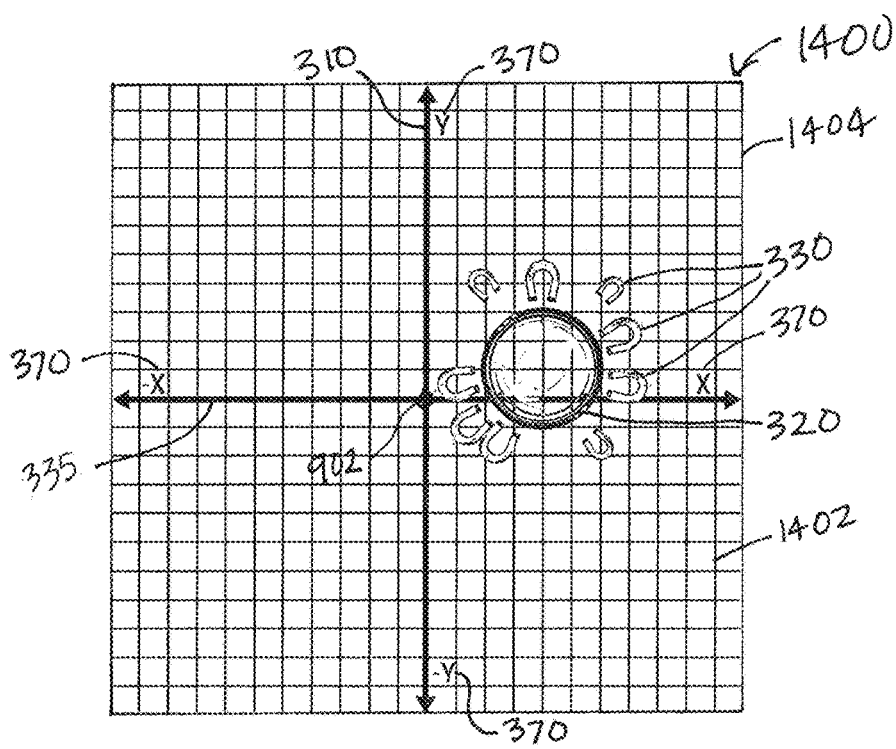

Referring next to FIG. 15, the exemplary user interface display 1400 of one computing device 104 of the drone control system 100 at another point in time while the group of users is collaboratively controlling the pointer 320 as a unified system is shown in another embodiment of the present invention. Shown are the first control axis 310, the second control axis 335, the graphical pointer 320, the plurality of user objects 330, the plurality of axis labels 370, the origin 902, the grid 1402, and the control area 1404.

FIG. 15 shows an example time step in which the swarm of networked users moved the graphical puck 320 to a non-origin location within the control area 1404 of the user interface display 1400. As the puck 320 moved from the starting position (at the origin 902) to the position shown in FIG. 15, the CCS 102 sent a stream of repeated updates to the Drone Controller 110, indicating a stream of new scaled locations in the physical space for the drone 105 to move to. In many such embodiments, the collaboratively controlled graphical pointer 320 is updated at a fast rate, while the drone's commanded position is updated at a lower rate. The fast rate may be, for example, every 200 milliseconds, while the slow rate may be every 2 seconds.

A valuable additional inventive method of the present invention is the unique control methods by which the system maintains a close correspondence between the location of the puck 320 in the control area 1404 (with respect to the reference origin 902) and the location of the drone 105 in the real physical world, with respect to a real-world reference location. Maintaining this correspondence is important because it takes time for the drone 105 to move to a new location in the real world, and if the real-world space is large, that time can be substantial. Conversely, moving a graphical pointer is usually very fast and could easily get way ahead of where the real drone actually is. To correct for this mismatch, the following methods have been developed.

Method 1: Simulated Mass and Simulated Damping

The repeatedly updated location of the collaboratively controlled pointer 320 is based on a real-time physical control system run by the CCS server 102, the control system based on a physics model that assigns simulated mass and/or damping to the puck 320, governing its motion in response to the user applied forces. By assigning appropriate mass and/or damping values, the simulated physical dynamics of the puck 320 can be made to match the physical limits of the drone 105 in the real world. For example, by assigning a sufficiently high mass and/or damping to the puck 320, based on the responsiveness of the real drone in the real world, the motion of the puck 320 can be sufficiently constrained such that its location within the control area does not get substantially ahead of the drone's location within the real physical space. Thus, by performing "dynamic matching" of the physics model of the collaboratively controlled pointer 320 to the real physical responsiveness of the drone, the experience of the participants will be substantially enhanced.

Method 2: Simulated Restoring Force

Figure 16:
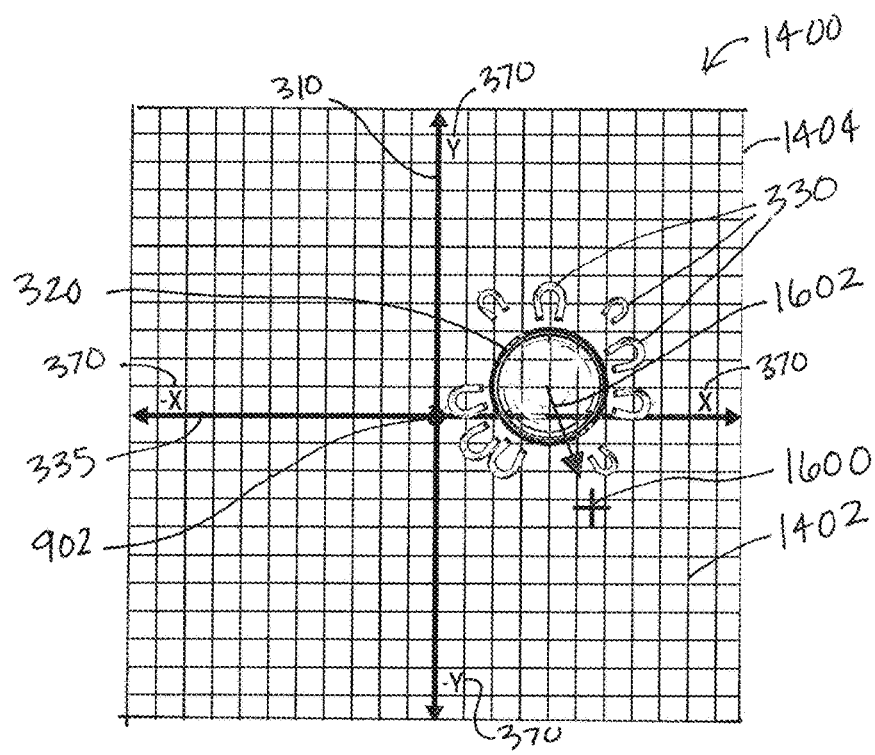

In addition to the mass and damping characteristics described in Method 1 above, or instead of them, a simulated restoring force may be applied to the puck 320, pulling the puck 320 back towards the location in the control area 1404 that corresponds with the current location of the drone in the real physical space. An example of the simulated restoring force method is shown in FIG. 16. The location on the control area 1404 corresponding to the actual current location of the drone 105 is the scaled virtual location of the drone (SVLD) 1600, as the location is a scaled representation of the location of the drone 105 in the real world, mapped virtually to the control area 1404 upon which the puck 320 is being manipulated. The restoring force 1602 pulls the puck 320 back towards the SVLD location 1600 within the control area 1404. The users must overcome the restoring force 1602 to break the correspondence between the two spaces, and if the restoring force 1602 increases with increasing distance between the current scaled virtual location 1600 of the drone and the current location of the puck 320, the size of the mismatch will be maintained as very small. To enable this method, the drone 105 must track its position, either using GPS or other coordinate tracking methods, or by dead reckoning based on motion. The drone 105 then repeatedly sends an updated representation of its location to the CCS 102, which then compares the puck 320 location to the SLVD location and applies the restoring force 1602 to the puck 320 accordingly.

The restoring force 1602 may be a linear or non-linear spring force, the greater the distance between the puck 320 and the SVLD location 1600, the larger the restoring force 1602. By applying a simulated stiff spring, the puck 320 will not deviate far from the position in the control area 1404 that corresponds with the actual location of the drone 105. This offers an advantage to Method 1 above, in that the restoring force method tracks the actual location of the drone 105, so even if the drone 105 faces unexpected dynamics (for example a head wind or tail wind), the puck 320 and drone 105 do not deviate substantially.

In some embodiments of the present invention, the system may switch between relative motion control (as shown for example in FIG. 9) wherein the users collaboratively control a direction and speed to the drone within a space, and absolute position control (as shown for example in FIG. 14) wherein the users collaboratively control the absolutely position of the drone in a space. Enabling these two alternate modes, and enabling a seamless switch between the modes, has substantial inventive value as the relative motion control mode is useful for controlling a drone as it moves over a large distance, and the absolute position control is useful for controlling a drone with fine positioning within an area. The current invention enables the users to selectively switch between modes. Furthermore, when the users switch from relative control mode, to absolute position mode, the origin of the control area (i.e. the center of the axes 310, 335 shown in FIG. 14)) is updated to the current plan coordinate position of the drone 105 in the physical world.

Thus during a typical flight of the drone 105, the users may start out in relative control mode and may command the drone 105 to fly northwest at a particular speed, for a particular time, with continuous real-time updating of the direction and speed, enabling the drone to fly under collaborative control of the users to a general location in the real world. The users may then switch to absolute control mode. When that switch is made, the origin of the control area (i.e. the origin 902 as shown in FIG. 14) is assigned to correspond to the current location of the drone 105. In many preferred embodiments, the drone 105 is automatically commanded to slow and hover in space when the transition between modes is made.

In some embodiments, the transition between modes is controlled automatically using a heuristic. In one inventive heuristic, the transition is controlled as follows: When the drone 105 is hovering or moving at a slow speed, the absolute position control interface (e.g. as shown in FIG. 14) is presented and used, as displayed upon the portable computing devices 104. But if the drone 105 is commanded to move beyond the limits of the control area 1404 shown in FIG. 14, the mode switches to relative control, as shown in FIG. 9. If the drone is commanded to hover, or stay at a slow speed (a speed below a threshold value) for more than a threshold amount of time (for example 10 seconds), the mode switches back to absolute position control. In this way, the users may collaboratively control a drone in a physical space, and collaboratively switch between control modes, using their collective will to choose between relative control mode and absolute position control modes.

Figure 17:
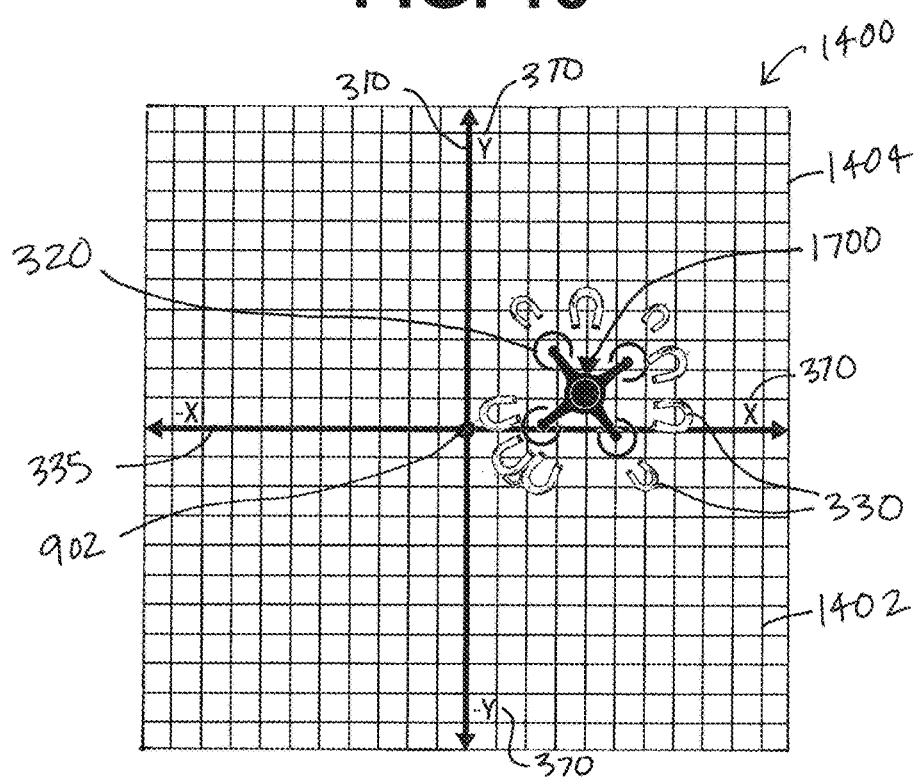

Referring next to FIG. 17, in another embodiment of the present invention, the pointer 320 is represented by a graphical representation of the actual drone, including a camera representation 1700 of where the camera 115 is located on the drone 105. In FIG. 17 the camera representation is a triangle, where triangle location represents the location of the camera 115 on the drone 105.

In some such embodiments, the magnet icon embodiment (as shown in FIGS. 4-7) may be used both to apply a pulling force on the location of the drone 105, as well as a pulling force to change the orientation of the drone 105. In this way, a group of users may collaboratively control under real-time swarm manipulation, both the position and orientation of the drone 105 through closed-loop feedback control.

Figure 18:
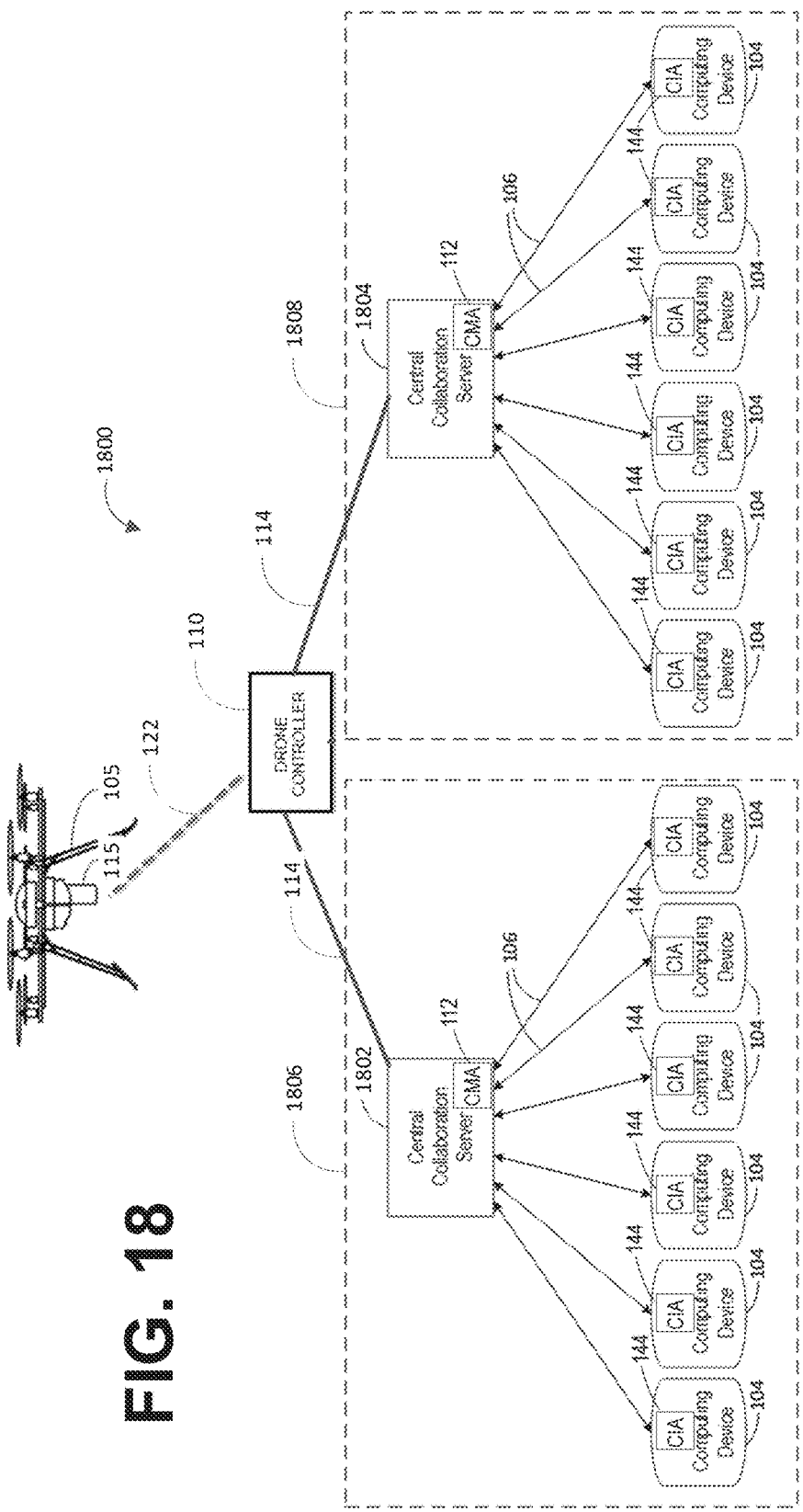
FIG. 18 is a schematic diagram of an exemplary multi-swarm vehicle operation collaboration system.

Referring next to FIG. 18, a schematic diagram of an exemplary multi-swarm collaboration system 1800 is shown. Shown are a first Central Collaboration Server (CCS) 1802, a second CCS 1804, a first swarm 1806, a second swarm 1808, the plurality of computing devices 104, the drone 105, the plurality of exchanges of data 106, the drone controller unit 110, two server communication links 114, the camera 115, and the drone communication link 122.

In some embodiments of the present invention, the plurality of users may be split into multiple swarms. In the example of FIG. 18, the plurality of users is split into two swarms. The first swarm 1806 comprises a portion of the plurality of computing devices 104, each computing device in the first swarm 1806 in communication with the first CCS 1802. The second swarm 1808 comprises the remainder of the computing devices 104, which are each in communication with the second CCS 1804. Each server 1802, 1804 is in turn in communication with the drone controller 110 via the connection links 114. In other embodiments, the plurality of users is split into more than two swarms.

In one embodiment, one swarm of users (e.g. the first swarm 1806) can collaboratively control the motion of the drone 105, and another swarm of users (e.g. the second swarm 1808) can collaboratively control the pan, tilt, and/or zoom of the camera 115 on the drone 105. In other embodiments of the present invention, the plurality of users may be split into multiple swarms, with one swarm of users collaboratively controlling the direction of motion of the drone 105, and another swarm of users collaboratively controlling the orientation of the drone 105. In this way, swarm of users may form a plurality of intelligent systems, each of said intelligent systems controlling an aspect of the drone, the intelligent systems working together to create the full experience. In such embodiments, multiple CCS servers work in parallel, all connected to the same drone controller 110.

While the above examples are generally shown with respect to flying drones, the current invention can be used to control other vehicles, for example driving drones wherein the position and/or motion of the driving drone is fixed to ground-based operations. Similarly, water-based drones (either surface boats or underwater drones) can be controlled using the methods of the present invention. In addition, end-effectors can be added to drones as are known the current art. These end effectors can be controlled by user-swarms through collaborative real-time manipulation, using the multi-swarm methods disclosed above, wherein a swarm of users are enabled to control the end effector.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A real-time collaborative vehicle control system comprising:

a plurality of computing devices each comprising a communications infrastructure coupled to each of a processor, a memory, and a collaborative intent application stored on each memory and configured to run on each processor, and a user interface coupled to a display and configured to receive input from a user;

a collaborative server in networked communication with the plurality of computing devices, the collaboration server including a processor and a memory;

a vehicle controller configured to receive commands from the collaborative server; and a vehicle operatively controlled by the vehicle controller, wherein the control system is configured to perform the following steps, wherein computing device steps are performed substantially simultaneously on each of the plurality of computing devices:

display, on each of the computing devices, vehicle control information, and a collaboratively controlled graphical indication having a coordinate location in relation to the vehicle control information;

receive, on each of the computing devices, repeatedly in real-time, user input of a user intent vector through the user interface, the user intent vector having a direction in relation to the user control information and a magnitude, send, repeatedly in real-time, the user intent vector to the collaboration server, responsively determine, repeatedly in real-time by the collaboration server, a group intent vector from the plurality of received user intent vectors, and determine, repeatedly in real-time by the collaboration server, an updated coordinate location based on the group intent vector;

determine, repeatedly in real-time by the collaboration server, at least one vehicle command in response to the updated coordinate location;

send, repeatedly in real-time by the collaboration server, the at least one a vehicle command to the vehicle controller, whereby the vehicle operates in response to the at least one vehicle command;

send, repeatedly in real-time by the collaboration server, the updated coordinate location to the plurality of computing devices; and update, repeatedly in real-time by the computing devices, the location of the collaboratively controlled graphical indication using the received updated coordinate location, whereby a closed-loop system is formed between the collaboration server and each collaborative intent application.

2. The real-time collaborative vehicle control system of claim 1, wherein the vehicle is a flying drone vehicle.

3. The real-time collaborative vehicle control system of claim 2, wherein the at least one control axis includes at least one of a control axis indicating forward/backward motion of the vehicle and a control axis indicating leftward/rightward motion of the vehicle.

4. The real-time collaborative vehicle control system of claim 2, wherein the collaboratively controlled graphical indication is influenced by a simulated spring force, said simulated spring force configured to pull the displayed collaboratively controlled graphical indication towards an origin position on the at least one control axis.

5. The real-time collaborative vehicle control system of claim 1, wherein the vehicle control information includes at least one control axis, wherein a location of the graphical indication relative to the at least one control axis indicates the at least one command sent to the vehicle.

6. The real-time collaborative vehicle control system of claim 5, wherein the first control axis and the second control axis intersect at an origin location.

7. The real-time collaborative vehicle control system of claim 5, wherein the at least one control axis includes a first control axis oriented vertically and a second control axis oriented horizontally.

8. The real-time collaborative vehicle control system of claim 1, the system further comprising a camera coupled to the vehicle and operatively controlled by the vehicle controller.

9. The real-time collaborative vehicle control system of claim 8, wherein the camera is configured to stream live video to the plurality of computing devices.

10. The real-time collaborative vehicle control system of claim 8, wherein each of the plurality of computing devices displays the live video on a same display as the collaboratively controlled graphical indication.

11. The real-time collaborative vehicle control system of claim 1, wherein the at least one vehicle command includes at least one command for camera operation.

12. The real-time collaborative vehicle control system of claim 1, wherein the at least one command for camera operation includes at least one of forward/backward tilt and leftward/rightward pan.

13. The real-time collaborative vehicle control system of claim 1, wherein the system is configured to display a graphical indication of the user input.

14. The real-time collaborative vehicle control system of claim 13, wherein the graphical indication is a U-shaped magnet icon.

15. The real-time collaborative vehicle control system of claim 14, wherein the system is configured to change at least one of the size, orientation, and location of the magnet icon based on the user input.

16. The real-time collaborative vehicle control system of claim 1, wherein the collaboratively controlled graphical indication is displayed on a control area corresponding to a plan area of operation of the vehicle.

17. The real-time collaborative vehicle control system of claim 16, wherein the collaboratively controlled graphical indication represents a location of the vehicle in the control area.

18. The real-time collaborative vehicle control system of claim 16, the control area further including a display of plan coordinate axes.

19. The real-time collaborative vehicle control system of claim 1, wherein the collaboratively controlled graphical indication is an icon indicating the orientation of the vehicle.

20. The real-time collaborative vehicle control system of claim 1, wherein the collaboratively controlled graphical indication has at least one of a simulated mass value and a simulated damping value, the at least one of the simulated mass value and the simulated damping value selected to slow a displayed collaboratively controlled motion of the collaboratively controlled graphical indication to better match dynamics of the vehicle.

* * * * *